(12) United States Patent
Armitage

(10) Patent No.: US 9,058,589 B2
(45) Date of Patent: Jun. 16, 2015

(54) SUBJECTIVE USER INTERFACE

(75) Inventor: John P. Armitage, Berkeley, CA (US)

(73) Assignee: SAP SE, Walldorf (DE)

( * ) Notice: Subject to any disclaimer, the term of this patent is extended or adjusted under 35 U.S.C. 154(b) by 304 days.

(21) Appl. No.: 13/273,078

(22) Filed: Oct. 13, 2011

(65) Prior Publication Data

US 2013/0097528 A1   Apr. 18, 2013

(51) Int. Cl.
*G06F 3/00* (2006.01)
*G06Q 10/10* (2012.01)

(52) U.S. Cl.
CPC ..................................... *G06Q 10/103* (2013.01)

(58) Field of Classification Search
USPC ......... 715/753, 734, 738–739, 747, 751, 759, 715/810
See application file for complete search history.

(56) References Cited

U.S. PATENT DOCUMENTS

| | | | |
|---|---|---|---|
| 7,360,164 B2 * | 4/2008 | Bjoernsen et al. | 715/751 |
| 7,620,902 B2 * | 11/2009 | Manion et al. | 715/758 |
| 7,684,815 B2 * | 3/2010 | Counts et al. | 455/518 |
| 8,108,455 B2 * | 1/2012 | Yeager et al. | 709/202 |
| 8,112,713 B2 * | 2/2012 | Zuber | 715/738 |
| 8,214,746 B2 * | 7/2012 | Hamilton et al. | 715/751 |
| 8,230,352 B2 * | 7/2012 | Gaillard et al. | 715/753 |
| 2006/0240856 A1 * | 10/2006 | Counts et al. | 455/518 |
| 2008/0209343 A1 * | 8/2008 | Macadaan et al. | 715/747 |
| 2009/0157822 A1 * | 6/2009 | Chakra et al. | 709/206 |
| 2011/0191417 A1 * | 8/2011 | Rathod | 709/204 |
| 2012/0259675 A1 * | 10/2012 | Roehrs et al. | 705/7.29 |

* cited by examiner

*Primary Examiner* — Anil N Kumar
(74) *Attorney, Agent, or Firm* — Fountainhead Law Group PC

(57) ABSTRACT

Disclosed is a subjective user interface that allows a user to define a worknet from a set of data objects of a business enterprise. The user may instantiate channels which are subsets of the worknet. In embodiments, predefined channels may be created and then installed in the user's subjective user interface, which the user may choose as a new channel. Activity spaces may be defined within a channel comprising members of the channel. The data objects that comprise a worknet, or a channel, or an activity space may comprise people as well as non-person (inanimate) entities.

15 Claims, 38 Drawing Sheets

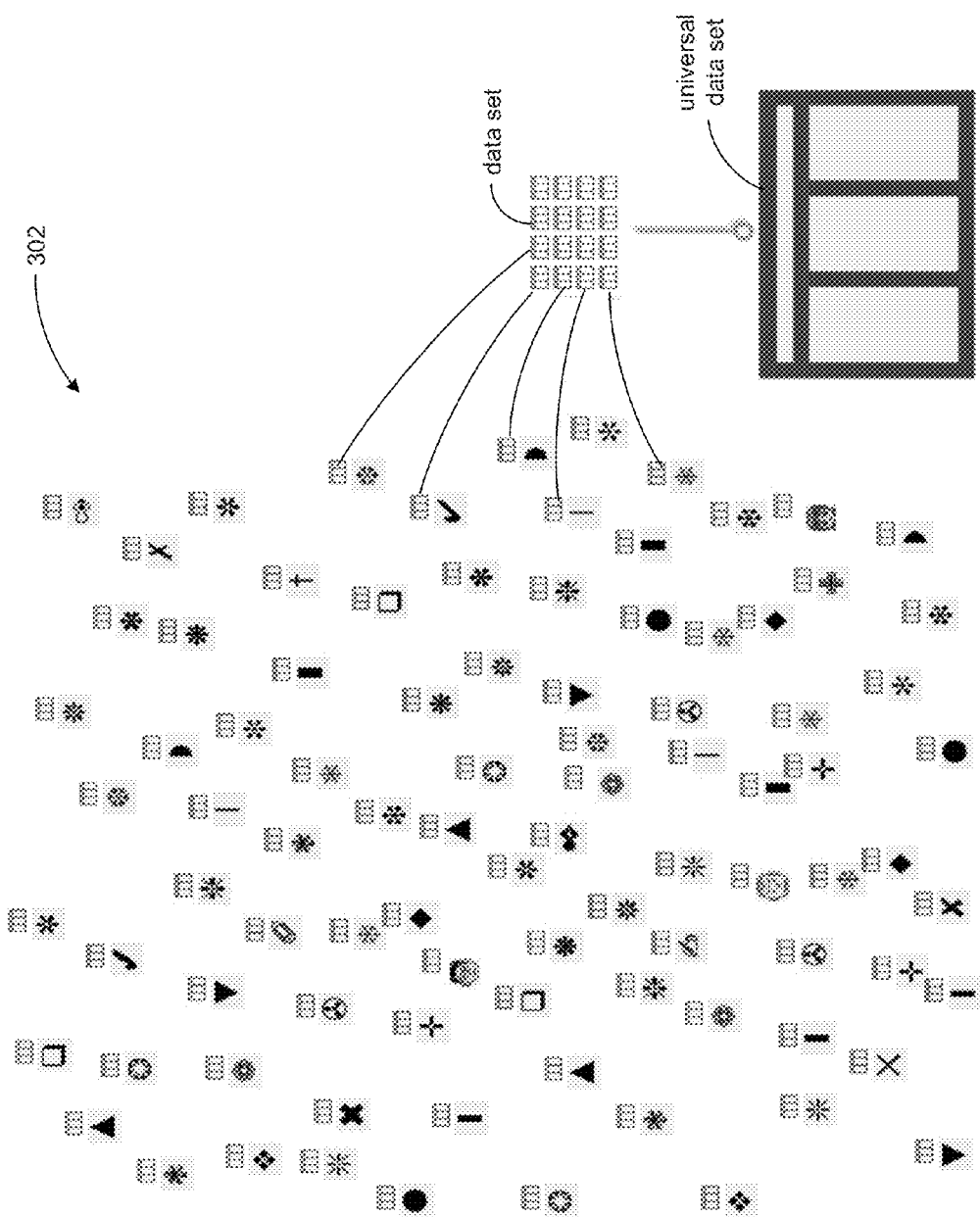

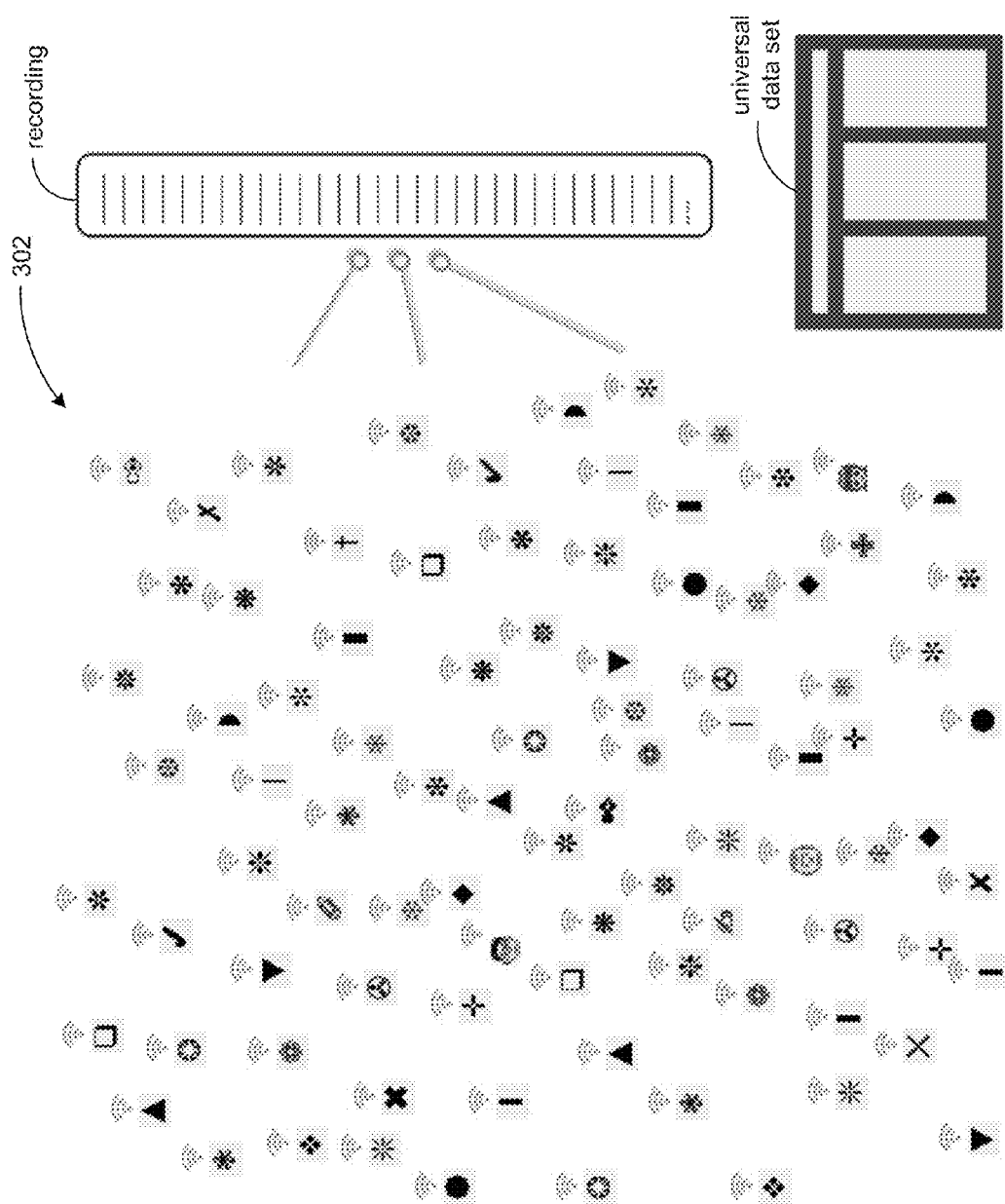

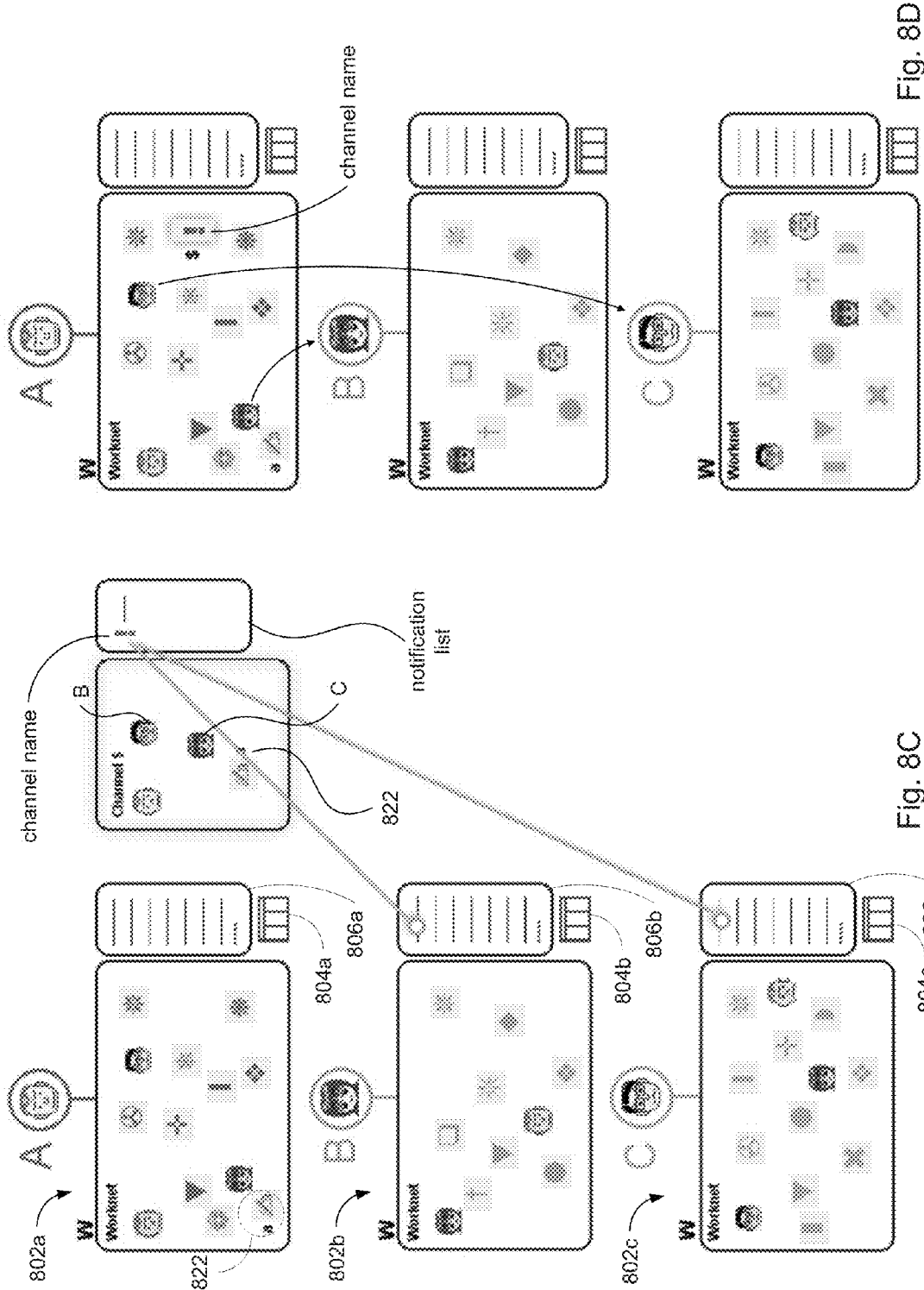

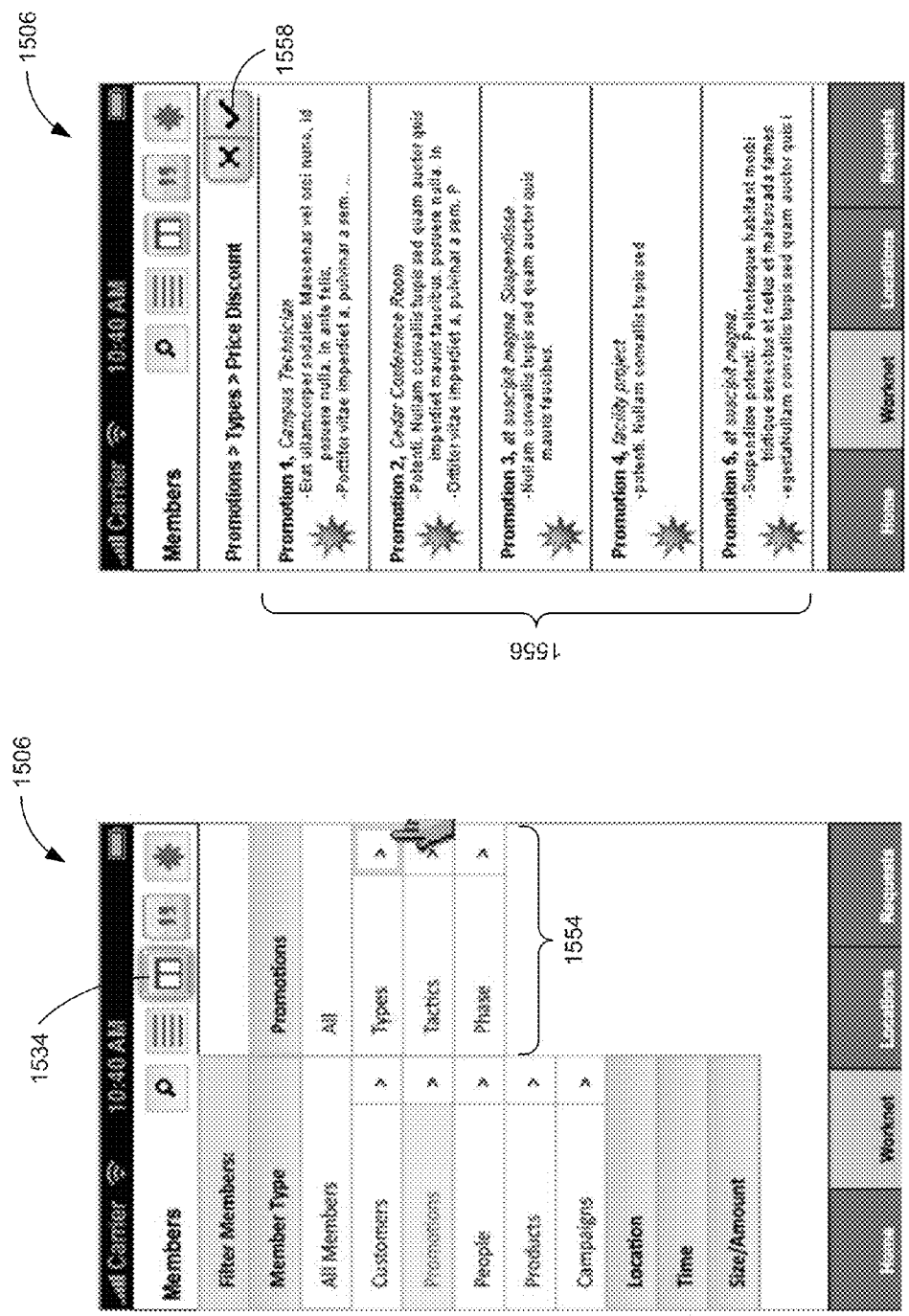

SUBJECTIVE USER INTERFACE

BACKGROUND

The present invention relates to managing the flow of information among elements of a business enterprise, and in particular to a computer user interface to facilitate the inflow of information to a user from elements of the enterprise, and vice-versa the outflow of information from the user to elements of the enterprise.

Unless otherwise indicated herein, the approaches described in this section are not prior art to the claims in this application and are not admitted to be prior art by inclusion in this section.

Enterprise software users have difficulty organizing the elements of their information work such as database records in Enterprise Resource Planning (ERP) databases, digital files, co-worker contact information, news stories from professional and amateur publishers, auto-generated updates from business processes, and short messages (updates or tweets) from co-workers and others in a business network, analytic displays of work-related data, and so on. Users may need to use ERP applications to access formal database records, email systems or messaging clients for interpersonal communication, websites or aggregation services for 3rd party news and opinions, and specialized collaboration products for file sharing and decision-making. The need to monitor and work with information assets in such a variety of formats, tools, and places makes it difficult to organize and coordinate information work, especially when working collaboratively in groups.

These and other issues are addressed by embodiments of the present invention, individually and collectively.

SUMMARY

A method for networking data objects of a business enterprise in accordance with embodiments of the present invention includes displaying a global directory that presents a user with the data objects of the business enterprise. The user may define a worknet comprising a subset of the data objects as members of the worknet. The membership may reflect characteristics of the user and the way the user organizes information, approaches problem solving, interacts with others, and so on. The user may instantiate channels in their worknet to accomplish tasks. Channels comprises subsets of the worknet membership. In an embodiment, predefined channels may be presented to the user, who may then select one. The selected predefined channel is instantiated as a channel belonging to the user and may be added to the user's worknet.

Feed viewers may be displayed to the user. A first feed viewer may present communications with members of the worknet. A second feed viewer may present communications with members of a channel.

The user may define an activity space within a channel. The activity space may comprises a subset of the members of the channel, and may include collaboration tools to facilitate activities among the members of the activity space.

In embodiments, in instantiating a new channel may include manually defining the new channel as an alternative to selecting the new channel from among the plurality of predefined channel definitions. In other embodiments, instantiating a new channel may include applying one or more filtering operations to identify a subset of members from the worknet as members of the new channel.

When a new channel is defined, a notification may be sent to each member of the new channel to notify the member that they have been added to the channel. The notification may be automatically generated and sent to the members of the new channel. The notification may be personalized by the user. In embodiments, the user may designate certain members of the new channel to not receive the notification.

The following detailed description and accompanying drawings provide a better understanding of the nature and advantages of the present invention.

BRIEF DESCRIPTION OF THE DRAWINGS

FIGS. 3 and 3A-3D depict aspects of the worknet model in accordance with principles of the present invention.

FIGS. 8A-8E depict aspects of manually defining a channel.

FIGS. 13A-13D illustrate screen mockups for activity spaces.

FIGS. 14A-14C illustrate screen mockups for performing analyses.

FIGS. 15A-15F illustrate screen mockups for a mobile device.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
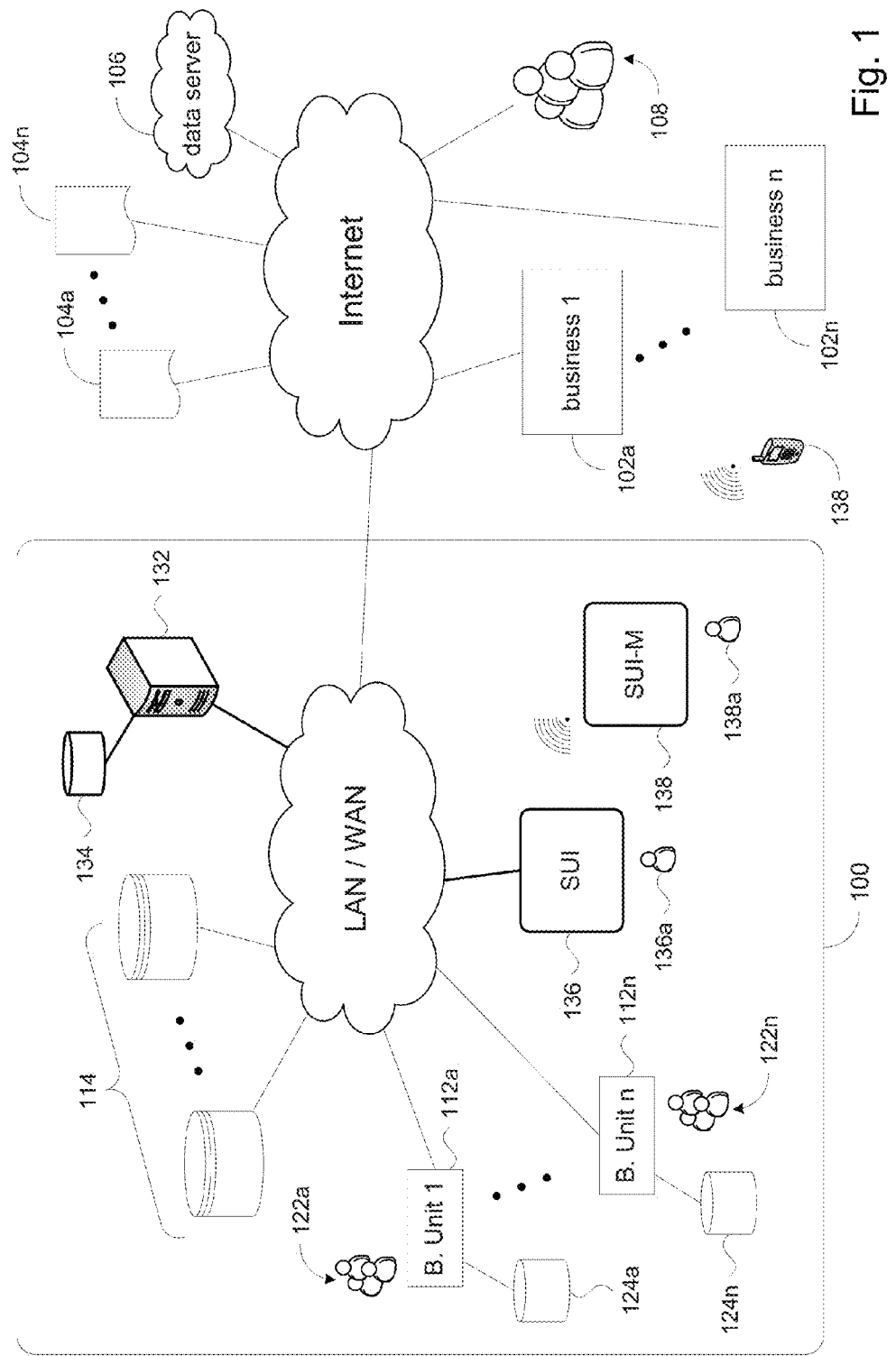
FIG. 1 illustrates a high level system diagram in accordance with the disclosed embodiments.

Referring to FIG. 1, a high level depiction of an embodiment in accordance with principles of the present invention includes a business enterprise 100 which may be connected via the Internet or some other suitable communication network to other businesses 102a-102n and to web sites 104a-104n. The businesses 102a-102n may be customers of the business enterprise 100, suppliers/providers of information, raw materials, and other resources to the business enterprise, and so on. Web sites 104a-104b serves as publishers of information, such as blogs, public data sources, etc., that the business enterprise 100 may access. Data servers 106 (e.g., a "cloud") may be a source of data. Other information sources 108 may include individuals (via email, for example), organizations, and the like. As will be appreciated, the business entities 102a-102n, web sites 104a-104n, data servers 106, and other information sources 108 may be viewed generically as "data objects" of the business enterprise 100, serving as a source of data to the business enterprise and in some cases serving as a recipient of data from the business enterprise.

The business enterprise 100 may be organized into various business units 112a-112n, such as a marketing group, production facility, research and design center, human resources department, and so on. Each business unit 112a-112n comprises its personnel 122a-122 and may include respective database systems 124a-124n to manage the data that the business units generate. The business enterprise 100 may maintain and manage enterprise-level databases 114, such as enterprise resource planning (ERP) data, customer resource management (CRM) data, product lifecycle management (PLM) data, product production system (PPS) data, and so on. The data that feed into the enterprise-level databases 114 may originate from the various business units 112a-112n, and may comprise data derived from their respective databases 124a-124n. As will be appreciated, the enterprise-level databases 114, the business units 112a-112n and their constituent personnel 122a-122n and databases 124a-124n may also be viewed generically as data objects of the business enterprise 100.

In embodiments, the business enterprise 100 may include a subjective user interface (SUI) server 132. A SUI server 132 may maintain and manage a SUI database 134 to manage data generated and used by the SUI server. The SUI server 132 supports one or more SUI clients 136, 138 in accordance with principles of the present invention. The SUI clients may be desktop clients 136 (e.g., desktops, laptops with docking stations, and so on) or mobile device clients 138 (e.g., smart phones, computer tablets such as the Apple® iPad® computer tablet, laptops, and so on). The SUI server 132 and SUI clients 136, 138 and the various elements of the business enterprise 100 may communicate with each other via a local area network (LAN). A wide area network (WAN) may be employed in addition to the LAN where, for example, the business enterprise has business units 112a-112n in various distant geographical locations where a LAN may not be suitable. The communication can be wired or wireless.

Figure 2:
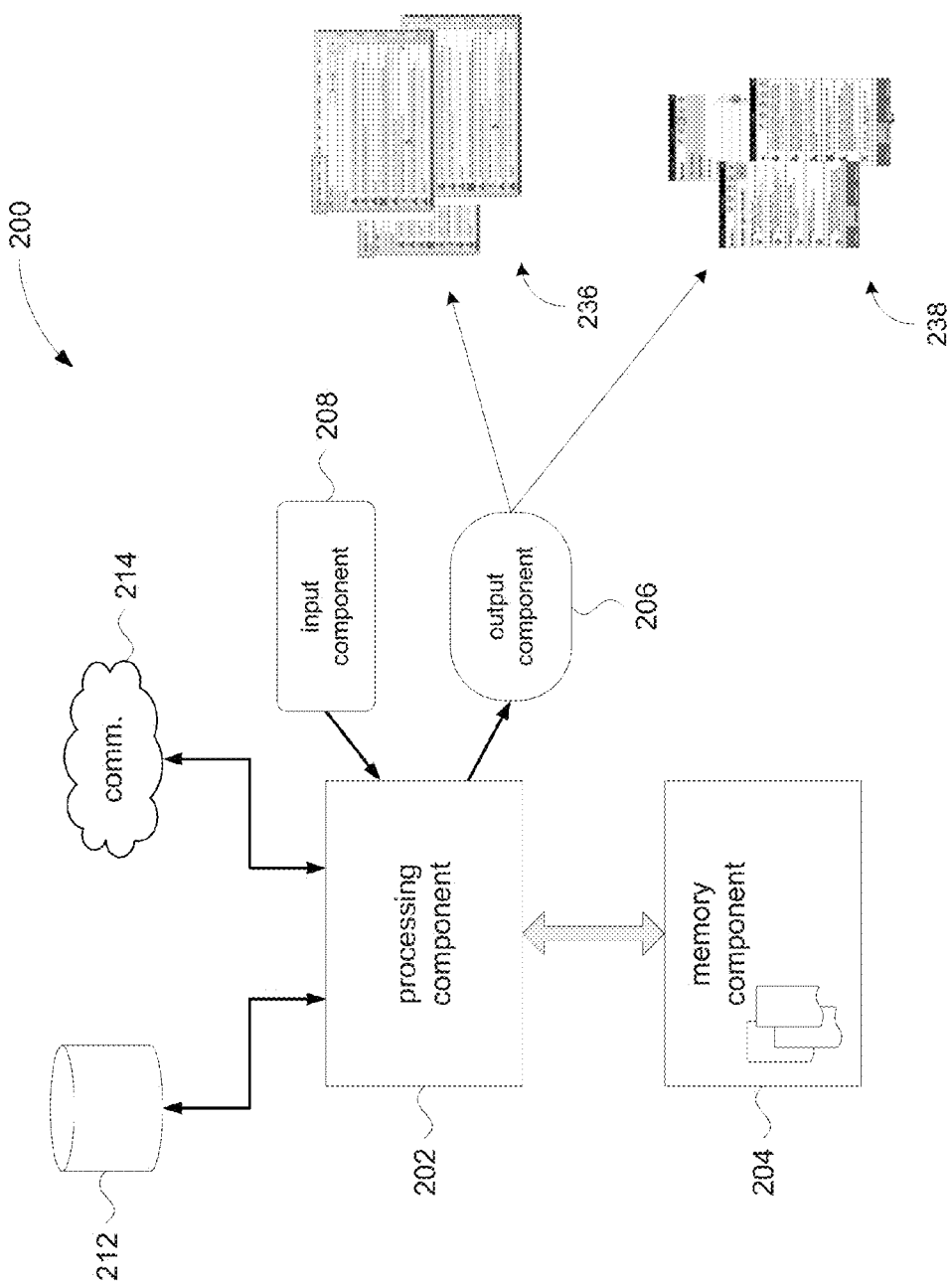
FIG. 2 is a block diagram of a computer system in accordance with embodiments of the present disclosure.

Referring to FIG. 2, embodiments of the SUI server 132 and SUI clients 136, 138 may include a computing system 200. The computing system 200 includes a processing component 202. The specific configuration of the processing component 202 may be a multi-processor architecture which may be suitable for the SUI server 132. The processing component 202 may be a central processing unit (CPU) device which may be suitable for the SUI clients 136, 138.

The memory component 204 may include various computer executable program code 204a for programming the processing component 202 to perform the method steps disclosed herein. The memory component 204 may comprise various forms of memory, such as DRAM, flash memory, ROM, and so on. In embodiments, the memory component 204 may include one or more tangible non-transitory computer readable media on which all or portions of the computer executable program code 204a are stored. It will be appreciated that the particular configuration of the memory component 204 will be different for a computer system 200 that embodies the SUI server 132 as compared to a computer system 200 that embodies a SUI client 136, 138.

An output component 206 may be a video display, such as a CRT display, an LED display, an LCD display, and so on. An input component 208 may include any suitable input device, such as a mouse input device, a keyboard, and so on. In the case of a smart phone SUI client 138, the output component 206 and input component 208 may be provided by a touch screen device. In embodiments, the output component 206 displays various UI screens 236, 238 for the SUI clients 136, 138, respectively.

The computing system 200 may connect with a mass storage component 212. For example, in the case of the SUI server 132, the mass storage component 212 may be storage server. In other embodiments, the mass storage component 212 may be a removable flash drive, a optical storage medium, a magnetic storage medium (e.g., hard disk drive), and so on. Depending on the software architecture in a particular embodiment, portions 204b of the computer executable program code 204a may be stored on the mass storage component. It will be appreciated that the software architecture comprises various component that reside either on the SUI server 132, on the SUI clients 136, 138, or may be shared between server and clients. it will be further appreciated that the present disclosure sets forth the required functionality of the SUI server 132 and SUI clients 136, 138, which can be implemented using conventional software technology and methodologies.

A communication cloud 214 represents various channels of communication, such as the Internet, a local network, wireless communication channels (e.g., Wi-Fi™, Bluetooth™, plain old telephone service—POTS, and so on). It will be appreciated that the processing component 202 may include suitable communication interface circuitry such as Ethernet communication circuitry, Wi-Fi™ communication circuitry, and so on.

In accordance with principles of the present invention, the various sources and forms of information of the business enterprise 100 (e.g., database records, email systems, and so on) are no longer segmented among disparate multiple systems, each having their own UI paradigms and conventions. In embodiments, the data objects of a business enterprise 100, such as the ones mentioned above, may be accessed and manipulated in a common UI environment, referred to herein as the subjective UI (SUI).

The SUI is a user experience design concept that enables users (information workers) to organize and adjust the above these data objects (work assets) according to their own unique "mental model", or overall way in which they and their work groups view and approach their work. In embodiments, the SUI introduces two related concepts: worknets and channels.

As will become more apparent in the disclosure that follows, a user's worknet is a display of the total sum of all work-related objects/entities/assets (data objects) that the user deems relevant, along with a display of all updates, or feeds/messages/events in text format sent by the "members" of the worknet. In embodiments, worknets are collections of relevant business entities stored as data, primarily other workers but including inanimate objects like products, facilities, events, etc., as well as internal or external publishers or data providers. Worknets include the data sets representing the entities, as well as their collective stream of updates. and may be viewable in multiple formats such as lists, maps, or analytic displays. Members of a worknet are referred to herein as "data objects."

Channels are sub-divisions of the worknet, and may be the main vehicle by which users organize their work. By dividing their worknet members into multiple categories, with no restrictions on membership (e.g., a channel could contain people contacts, product references, analytic reports, and feeds from a Web Blogger, etc), other users who are members of the channel have access to the channel as well, and all members can collaboratively edit the contents. Channels may be defined by the user based upon topics relevant to particular roles and/or individual users, and can be pre-determined or created ad-hoc (Subjects). They enable users to organize relevant assets and communications according to topics that are meaningful and relevant to their work.

In embodiments, members in the user's worknet are automatically "tagged" with the titles of all channels in which they are members, thus serving the valuable knowledge management function of making the corresponding data objects more discoverable via search and exploration by other interested users. Messages (updates) can be exchanged through channels and forwarded to recipients (channel members and non-channel members) as being sent from that channel, often via one of its members. Organizing messages by channel may be useful in organizing high volumes of event-driven text message traffic. Messages sent by members in a channel may be tagged with the channel name or some other information that identifies the channel, thus allowing for future data mining to identify anyone and anything related to the issues or topics associated with the channel.

Figure 3:
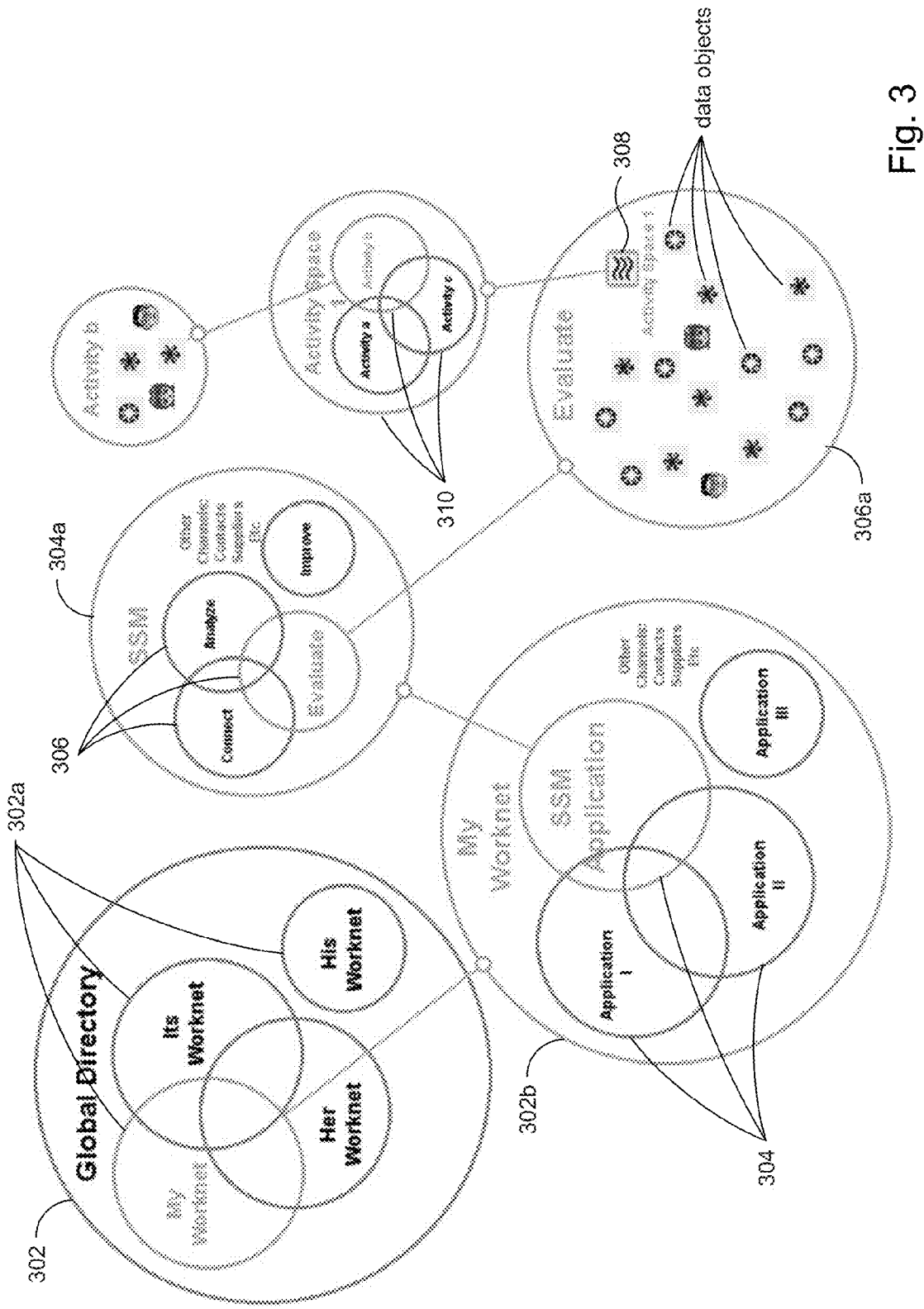

Referring now to FIG. 3, a high level overview of a worknet model 300 in accordance with principles of the present invention is discussed. The worknet model 300 may be represented and managed by the SUI server 132, and presented and accessed by users via SUI clients 136, 138. The worknet model 300 represents a framework for collaboration among intra- and inter-company networks of people and other data objects. The figure is illustrative the of the capabilities of the SUI and represents the ability and ease by which multiple hierarchies of subsets of data objects can be defined to accomplish work.

In embodiments, the most basic work element is the "data object", which can be any data source and/or data consumer such as people and non-person entities such as databases, processes and functions, messages, and context. The model 300 is represented as a Venn diagram, depicting sub-setting of data objects that can be made. A "global directory" 302 may define the set of all the data objects of the business enterprise 100. Various worknets 302a are defined for each user; e.g., user "My" has a worknet, user "Its" has a worknet, etc. As can be seen, each worknet 302a comprises a subset of the data objects of the business enterprise 100. The subset of data objects may be selected by the user, and may depend on their particular function in the business enterprise 100.

Consider the worknet 302b. As will be explained, the user may define channels 304 within their worknet to perform their tasks. Each channel 304 is defined by a subset of the data objects comprising that user's worknet, and may include one or more applications particular to the task that the channel was created for. The channel 304a called "SSM Application" (Sustainable Supply Management) may be further partitioned into its own channels 306. The channels 306 may comprises subsets of the data objects that constitute the SSM Application channel 304s, and may include tasks that need to be performed within the SSM Application channel. Thus, for example, in an SSM process, there may be a need to establish connections with the various suppliers of the business enterprise, and so a "Connect" channel may be defined. Likewise, other required tasks for SSM may necessitate an Analyze channel, an Evaluate channel, and an Improve channel. It will be appreciated that these channels 306 themselves may require their own supporting channels.

Activity spaces can be defined within a channel. For example, the channel 306a may comprise a set of data objects. An activity space 308 can be defined within the channel 306a. The activity space 308 may be created to perform short-lived tasks in support of the parent channel. For example, an activity space 308 may be created to reserve conference rooms at various hotels in the Cincinnati area for a product launch. The activity space 308 itself may be divided into yet smaller activities 310. As can be appreciated, the sub-dividing may continue down to lower levels if the particular activity requires it.

Figure 3A:
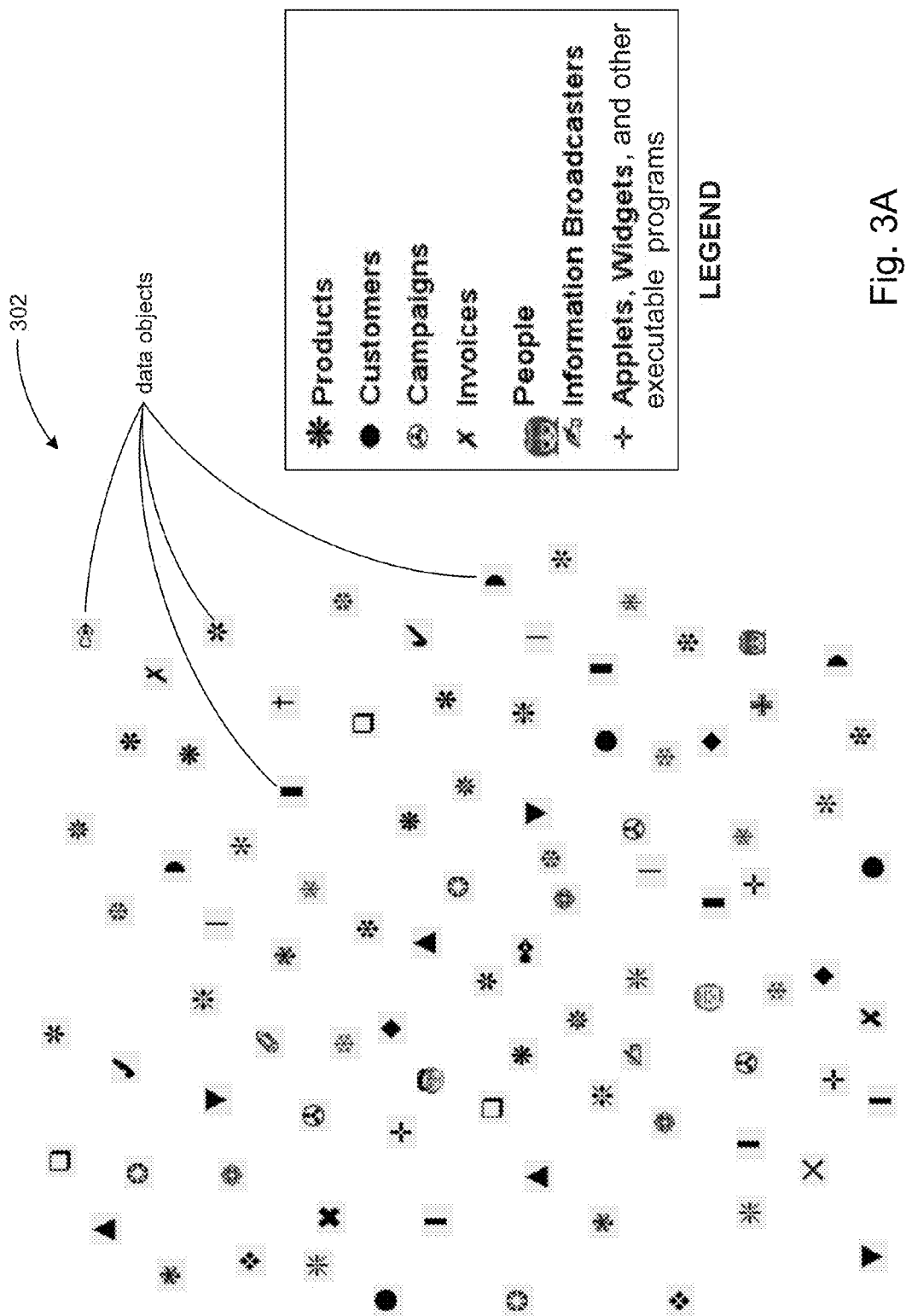

FIG. 3A represents the set of data objects that constitute the global directory 302. Data objects may be any relevant entity of the business enterprise 100, that may be stored in a databases (e.g., ERP database), data warehouses, private or public clouds and so on. A legend, for example, lists a non-exhaustive sampling of data objects of the business enterprise 100. Data objects come and go over time as their relevance changes during the life of the business enterprise 100. Accordingly, data objects will be added and removed from the global directory 302 as time passes.

FIG. 3B shows that data objects may be characterized by "data sets". Data objects typically represent entities in the real world. Describing them with structured data such as structured master data attributes along with metadata measures gives the data object "status" information that can describe the state of the data object. In embodiments, the data set may include "unstructured" data in addition to structured data. A universal data set may be generated by aggregating the data sets of the data objects that comprise the global directory 302.

FIG. 3C shows that data objects may logically or actually receive and/or send messages. For example, a person may actually send and receive messages. A database may logically send a message (e.g., by way of a proxy messenger application) and may logically receive a message. Accordingly, data objects may be able to send messages or updates about themselves (e.g., state information). For examples, just as people may update their status, business processes can send reminders and confirmations, products can update their sales figures, physical objects can update their geographical location, and so on. Drivers of such updates are generally referred to as "events." In embodiments, all the updates from the data objects that constitute the global directory 302 may be collected and compiled into a time-ordered "recording". The recorded updates may be monitored or mined for insight into the current or past status and trends of the data objects.

Figure 3D:
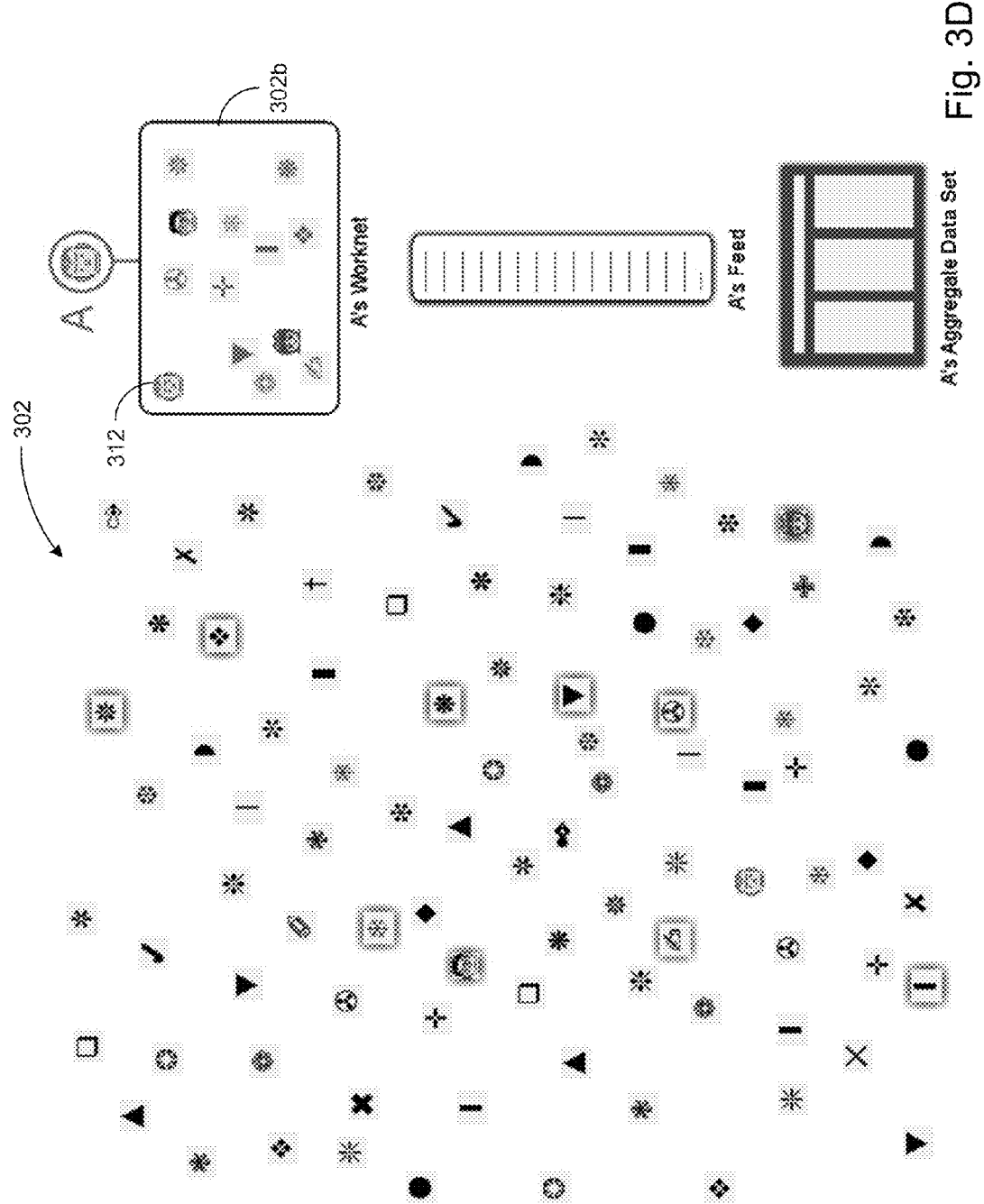

FIG. 3D illustrates an example of a worknet 302b for user "A". The worknet 302b comprises data objects ("member" of the worknet) selected from the global directory 302. In embodiments, the worknet 302b also includes user A as a member of the user's worknet 302b, as indicated by the graphic 312 of user A. The recording of updates from the data objects comprising worknet 302b are compiled into a "feed" for user A. An aggregate data set of the data objects comprising the worknet 302b is compiled for user A. In embodiments, user A's aggregate data set may include the structured data associated with each data object, plus the unstructured data that comprises user A's feed for the data objects. The aggregate data set therefore may serve as the raw material for awareness and insight into the data objects comprising the user's worknet, allowing the data objects to be accesses, organized, monitored, explored, analyzed, and acted upon.

Users create and manage things (data objects) related to their work. A task of an application is enabling discovery, access, collection, and "create, read, update and delete" (CRUD) functions for data object in the user's worknet 302b that are relevant to ongoing work. Furthermore, since data objects are shared by all users, the worknet 302b contains a pointer to each data object in the worknet.

In embodiments, a worknet 302b include messaging capability. Worknet members may send updates related to work activity, and by default the owner of the worknet 302b receives all updates from worknet members. In embodiments, the owner may suppress receiving updates from a particular worknet member.

Figure 4:
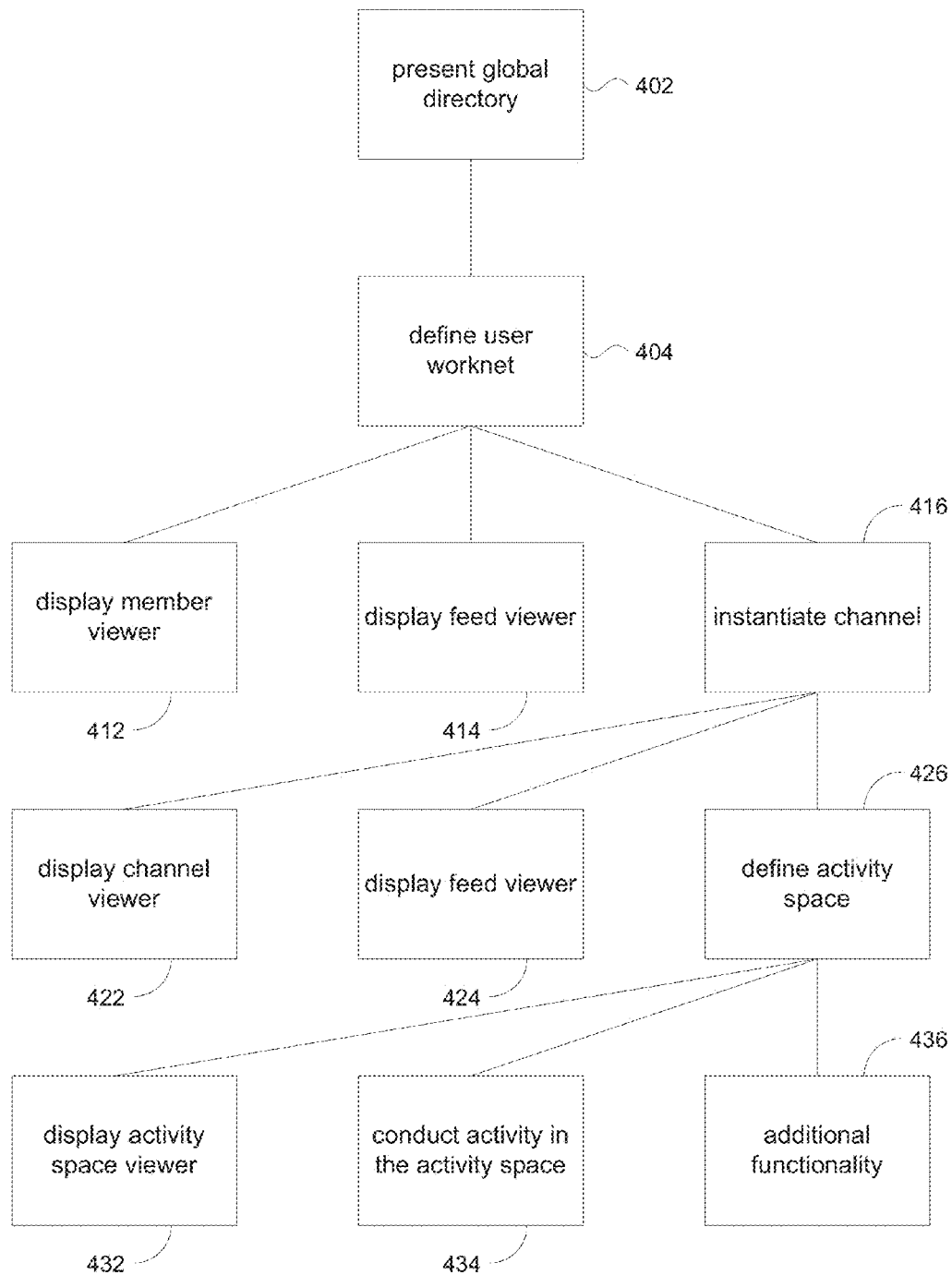
FIG. 4 is a general workflow for processing worknets and channels.

The general workflow that is facilitated by a SUI in accordance with the principles of the present invention may be shown by the flow chart in FIG. 4. In a step 402, the user may define their worknet by viewing and selecting from the global directory of data objects. Selected data objects become "members" of the user's worknet. In a step 404, the user is presented with a display of their worknet. Each user is associated with a worknet that comprises a plurality of members, which are data objects selected from a global directory of data objects of the business enterprise. The data objects are selected by the user depending on their situation, their particular needs, on going projects, and so on. Accordingly, the set of data objects comprising a worknet may be unique to the user who owns that worknet.

The user's worknet may be presented to the user via a member viewer. Accordingly, in a step 412, a member viewer may be displayed on the user's display device. An aspect of a data object is that it may receive a communication (data feed) from another data object. Accordingly, in a step 414, a feed viewer may be displayed on the user's display device to allow the user to communicate with their member data objects.

A user may instantiate one or more channels (step 416) be defining it manually, by selecting a predefined channel, and so on. A channel comprises member data objects selected from the user's. For example, an instance of a channel might be defined (created) to manage the marketing campaign for a new product. As will be explained below, the members of a channel (channel members) may have multiple communication options for communicating with each other and with data objects outside of the channel. Accordingly, a channel viewer may be displayed in a step 422 to facilitate managing the channel.

The channel itself may be considered as being just another member of the user's worknet. Accordingly, a channel may receive (and send) communications. Thus, in a step 424 a feed viewer for the channel may be displayed. In order to perform the several tasks that may be needed to accomplish the larger goal(s) for which the channel was created, the user may define activity spaces (step 426). The activity space may be viewed (step 432) with an activity space viewer. Having created an activity space, the members of the activity space may then conduct the necessary activities (step 434) to accomplish the task for which the activity space created.

As will become clear from the discussion that follows, additional functionality may be performed (436) by the SUI.

Following is a discussion of UI screens in accordance with principles of the present invention. The UI screens shown are rendered in a rough wireframe format and often with simulated content. Their intent is to demonstrate the workflow and logic of the systematic product concept rather than the specific appearance or layout of the UI.

Figure 5A:
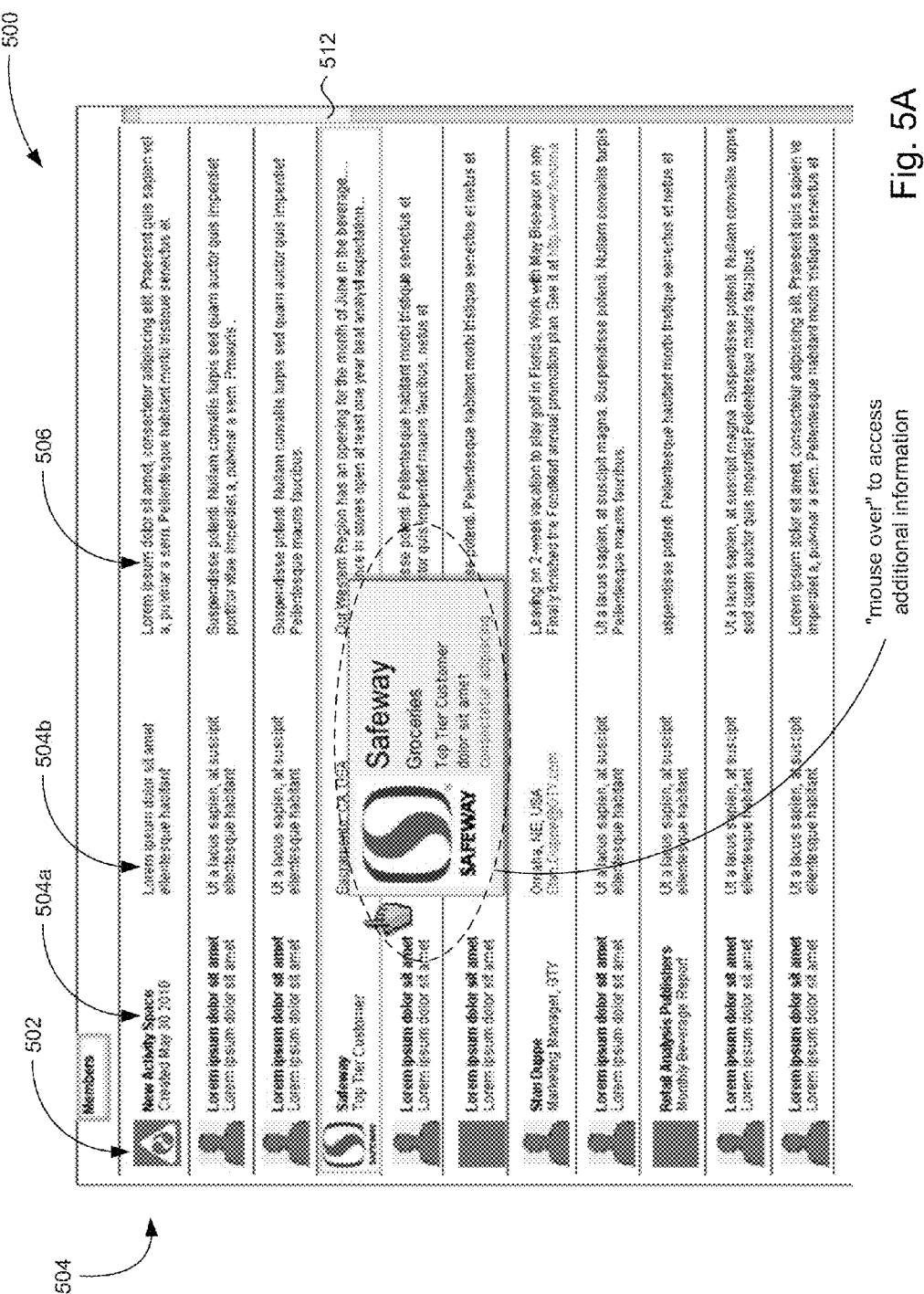
FIGS. 5A-5E illustrate screen mockups for navigating a worknet.

Referring to FIG. 5A, when a user successfully gains access to the system (e.g., "logs in"), the user may be presented with a member viewer window 500 which displays the user's worknet (e.g., FIG. 3D). In particular, information about each member of the user's worknet may be displayed. For example, the information may be presented in row format. A scroll bar 512 may be provided to scroll down to view additional members of the user's worknet. In an embodiment, for example, a thumbnail image 502, identifying information areas 504a, 504b, and a recent update area 506 may be displayed in a row of information 504 for each member. The figure shows that the user may "mouse over" an area (e.g., information area 504a) to pop up additional information. The row of information 504 may be extended horizontally to include additional information, and a scroll bar (not shown) may be provided to allow the user to scroll horizontally to access the additional information.

Figure 5B:
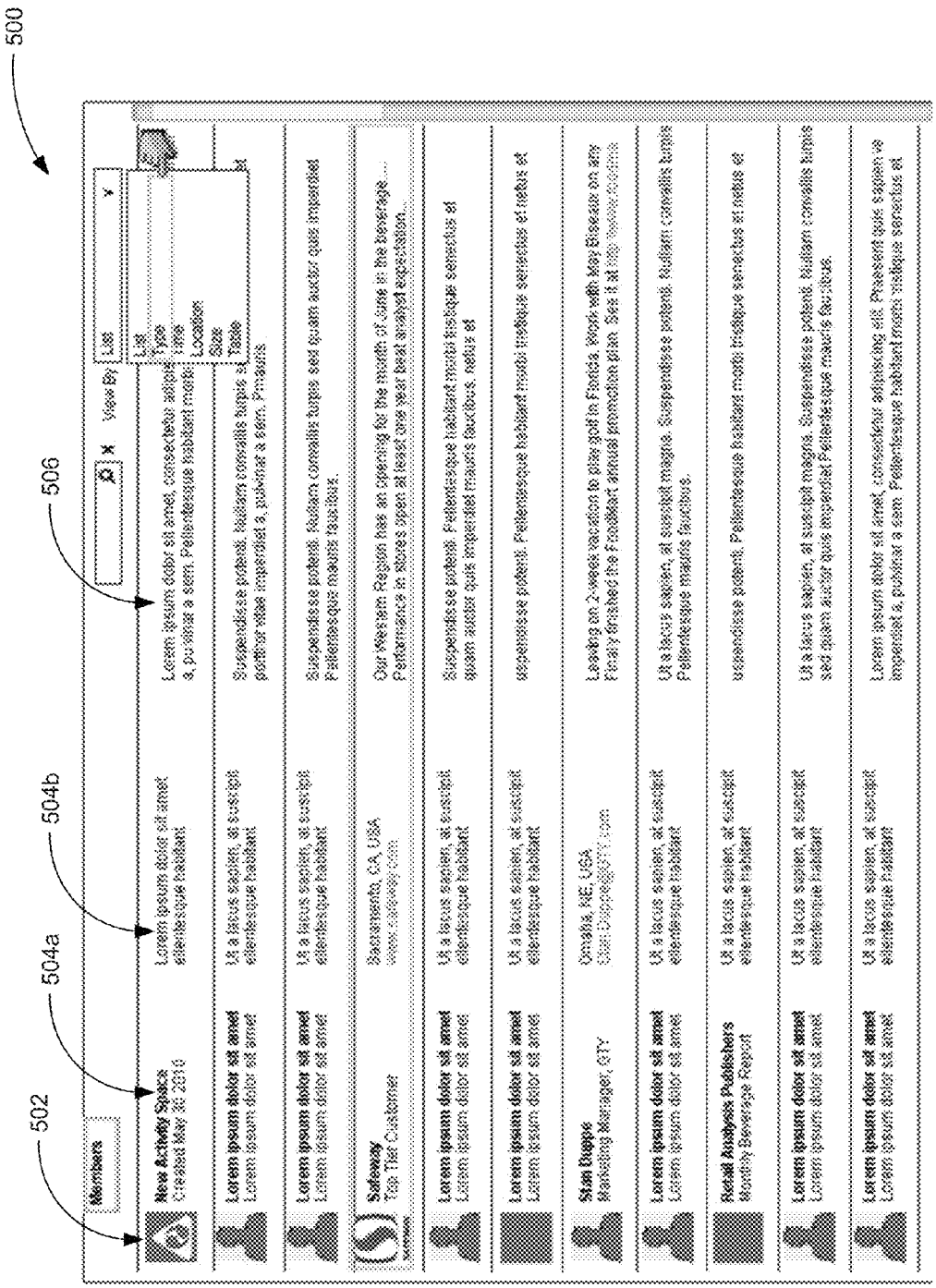
Figure 5C:

FIGS. 5B and 5C illustrate that members displayed in the member viewer 500 may be sorted in different ways. FIG. 5B shows an alternate views selector 522 that allows the user to view the members of the user's worknet in different ways. For example, the alternate views selector 522 shows the members can be view based on a list (e.g., an alphabetical listing of the members), member type, a time criterion, by location of the member, size, and so on. FIG. 5B shows an example where the user has selected to view the members by type. FIG. 5C shows an example of what the member viewer may display for a "type" listing; e.g., members may be Customers, People, and so on.

Figure 5D:
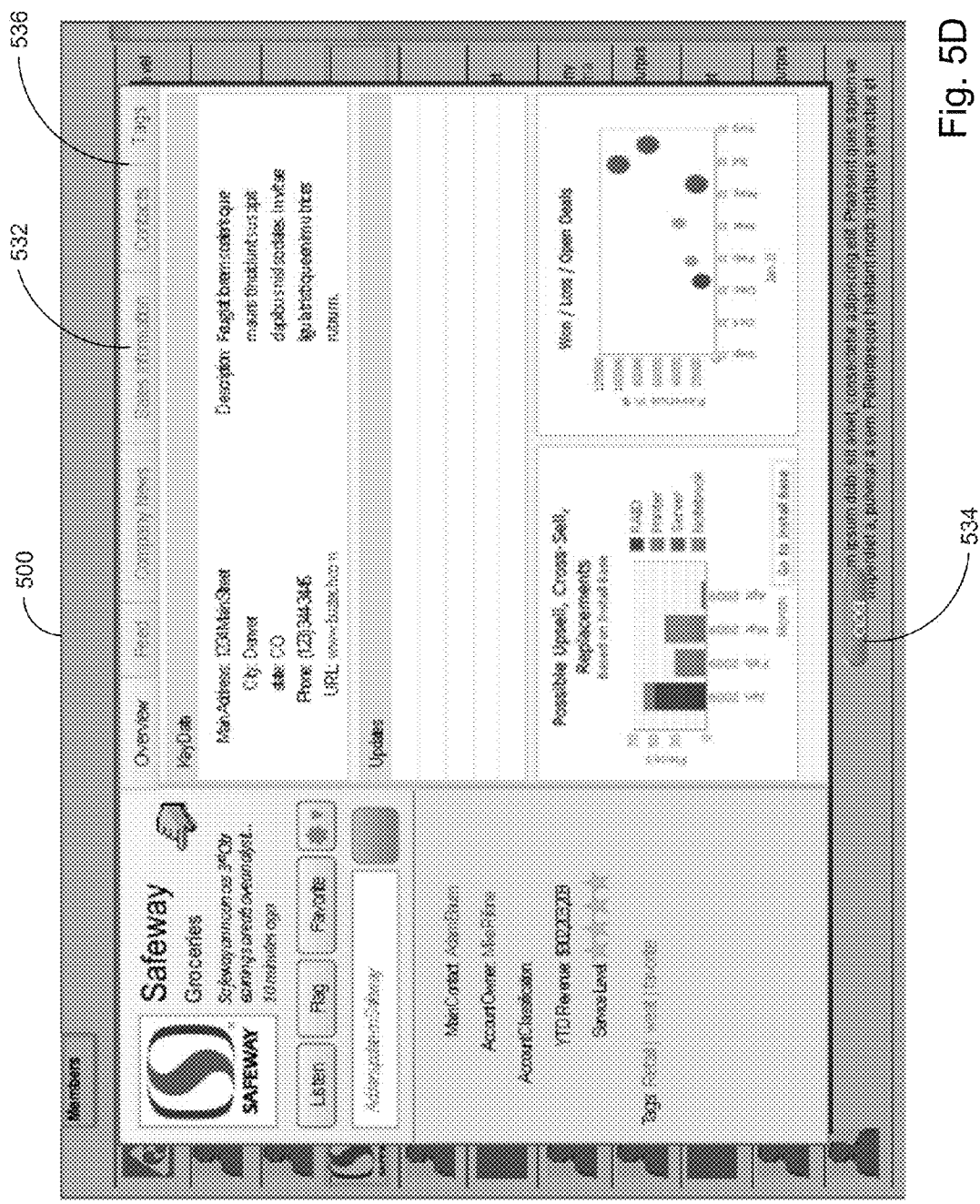

Members (data objects) comprise data, and in order for this data to be used by a user to do work, it needs to be consumable by the user. In embodiments, a member inspector viewer may be invoked to view details about a member. FIG. 5D illustrates an example of a member inspector 532, which may comprises a window that overlays the member viewer window 500. The user may access the member inspector viewer 532, for example, by double-clicking on the row of information corresponding to the member of interest. The member inspector viewer 532 may provide access to all of the member's relevant information; e.g., the member may have master- and meta-data which would be displayed. In embodiments, the member inspector viewer 532 may serve as a conduit for communication, collaboration, and even limited editing capability. A CLOSE button 534 is provided so the user can close the member inspector viewer 532 and return the main member viewer 500.

In embodiments, members of a worknet may be "tagged". As will be explained below, tagging may be automatically performed in connection with channels. A member of channel will be tagged with an identifier of the channel. In this way, members can be identified in terms of their affiliations with channels. In an embodiment, members may be explicitly tagged by the user. FIG. 5D shows a TAG button 536 in the member inspector viewer 532 that allows a user to tag that member. Policies regarding tagging confidential channels may have to be addressed, but are beyond the scope of discussion of the present invention.

Figure 5E:
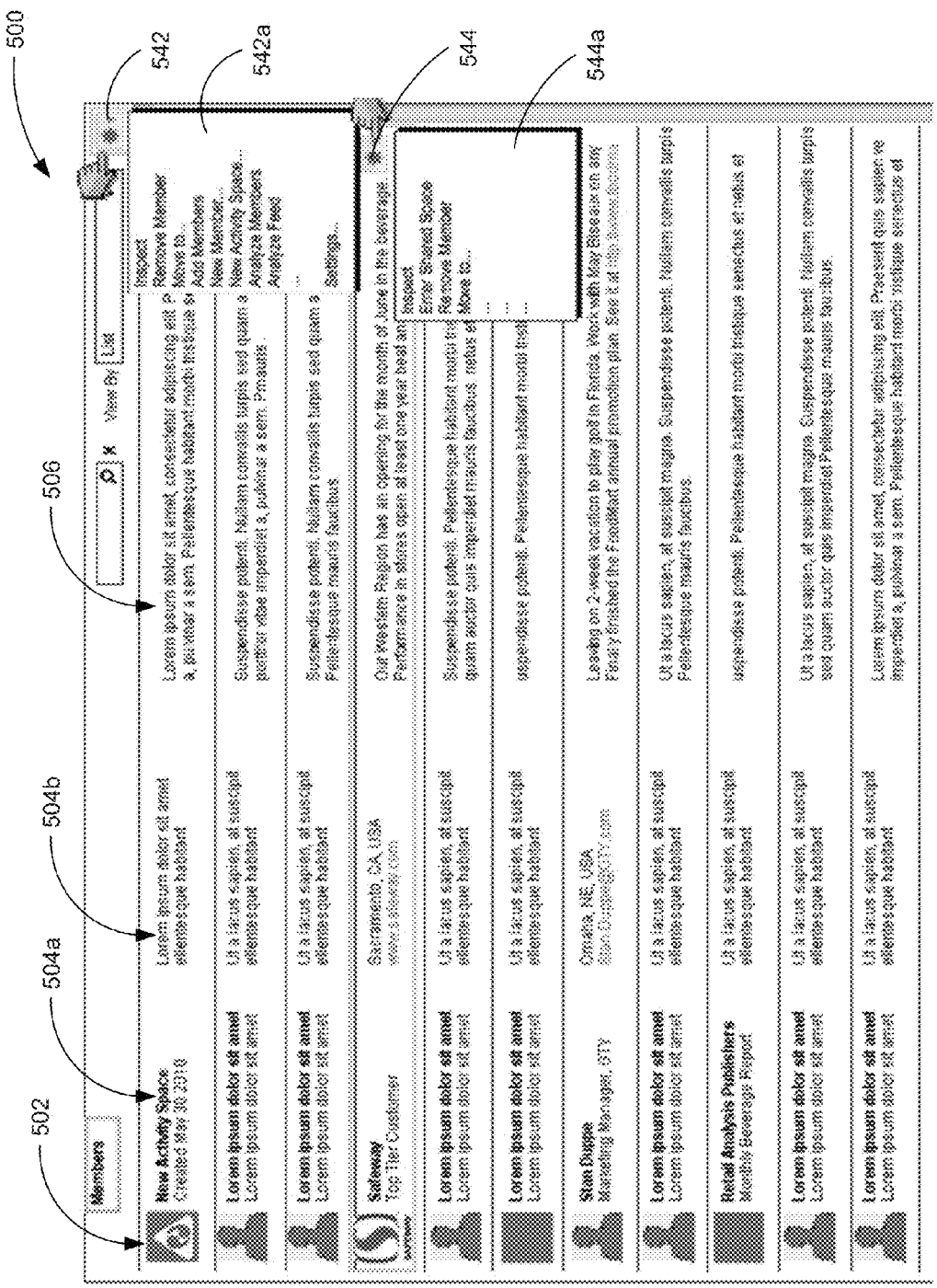

The user may manipulate its worknet. For example, members may be added or deleted, or moved around. Analyses can be performed, and so on. Referring to FIG. 5E, in embodiments, the member viewer window 500 may include an action widget 542, which can be activated (e.g., "right-click" with a mouse device) to produce a dropdown menu 542a of action items. In an embodiment, a Settings window (not shown) may be accessed from the action widget 542 in order to configure settings for the member viewer window 500. In some embodiments, the member viewer window 500 may provide a member-specific action widget 544 for one or more members of the worknet. A dropdown menu may reveal action items 544a specific to each member.

Figure 6A:
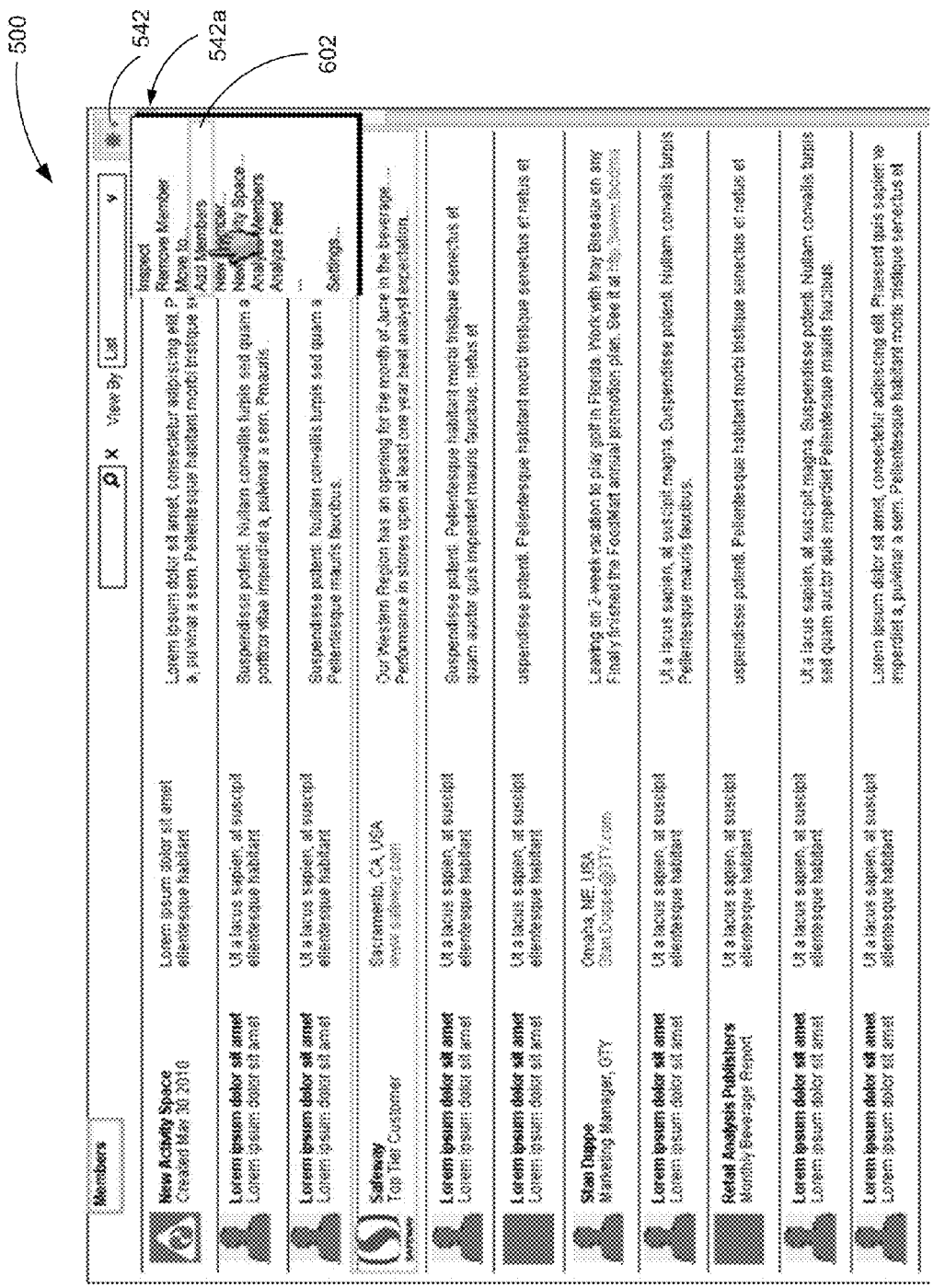
FIGS. 6A and 6B illustrate screen mockups for adding a member to a worknet.
Figure 6B:
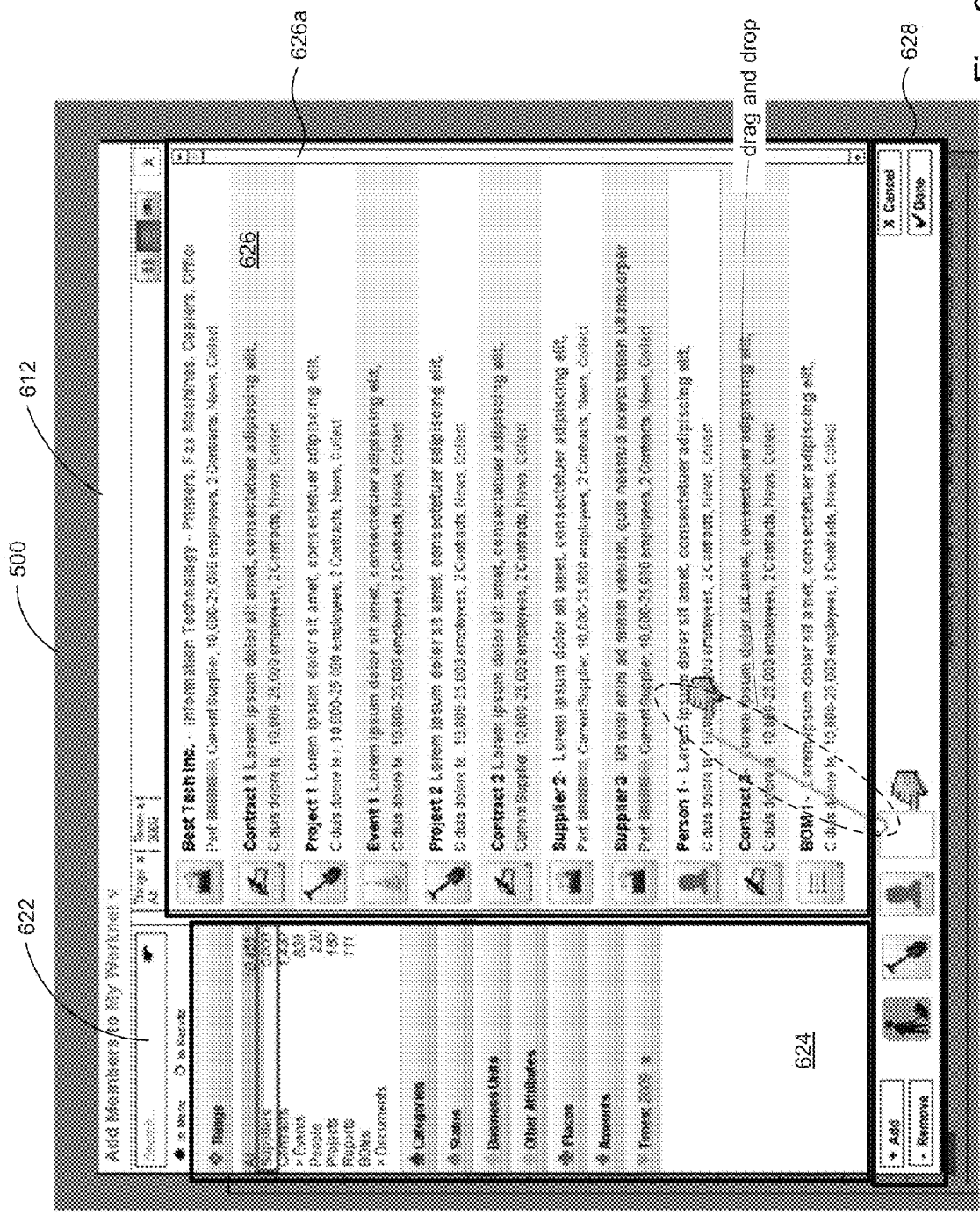

FIGS. 6A-6C illustrate how a member may be added to the user's worknet. FIG. 6A shows that the process may start from the dropdown menu of action items 542a, where an action item 602 for adding a member is selected. In response, a global directory search pane 612, shown in FIG. 6B, may pop up atop the member viewer 500. The global directory search pane 612 provides access to the entire set of data objects of the business enterprise 100 (see FIG. 3). The user may select one or more data objects for inclusion into their worknet.

The global directory search pane 612 may list every data object of the business enterprise 100 in a display area 626. A scroll bar 626a may be provided to allow the user to scroll down the list of data objects to choose from. In embodiments, a search box 622 may be provided to allow the user to enter search text. The search text may be matched against data in the aggregate data sets of each data object. If a match occurs, that data object is listed in the display area 626, thus possibly reducing the number of data objects in the display area from which to choose. Selection options 624 may be provided to limit the kinds of data objects that are shown in the display area 626. For example, the user may only select data objects that are Suppliers, or the user may be interested only in Reports type data objects, and so on.

In the display area 626, the user may drag and drop one or more data objects into a collection area 628. Data objects in the collection area 628 may be removed (e.g., select the data object and click the Remove button), or added to the user's worknet (e.g., using the Add button). When the user has completed, they may click the Done button.

It is noted in connection with FIGS. 6A and 6B, that a new user's initial worknet may be an empty set; e.g., the new user may not have any members in the worknet. In that case, the member viewer 500 shown in FIG. 6A may have no members. The user may add members, as explained above in connection with FIG. 6B, in order to build up their worknet. Alternatively, the new user's worknet may have a default set of members (e.g., the co-workers in the new user's group may be used as the default membership). The user may then customize their worknet by adding and deleting members as illustrated in FIG. 6B.

Figure 7:
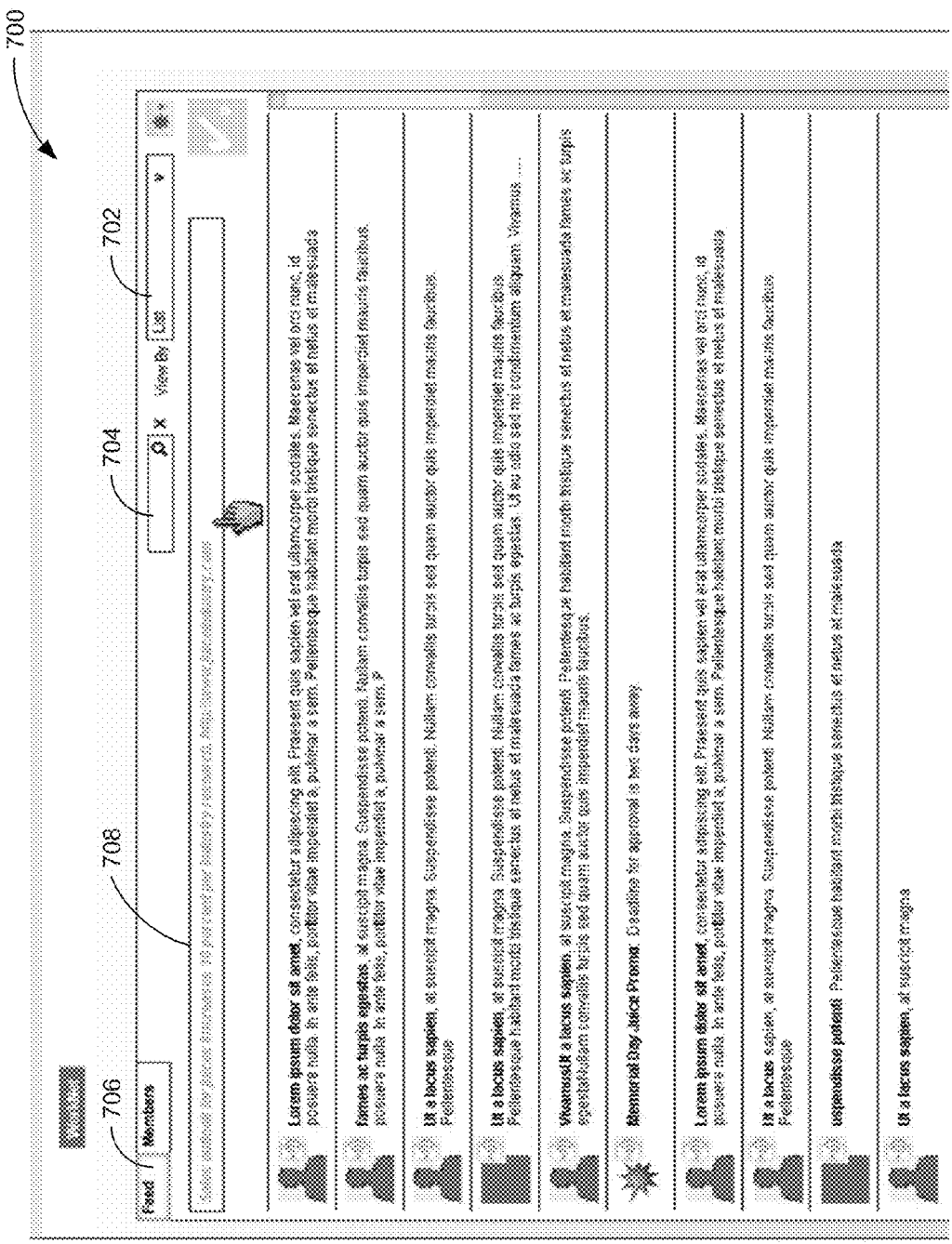
FIG. 7 illustrates a screen mockup for a feed viewer.

Users may send and receive messages with the members of their worknet. In embodiments, these messages may be referred to as "updates." Any member, in principle, may send a message to the user; e.g., non-person entities such as products, facilities, business processes, and so on. Broadcaster members, such as a blogger who is within business enterprise 100 or outside of it, or other informal and formal media outlets may also participate. FIG. 7 shows, in embodiments, a feed viewer 700 for displaying and managing the update feeds. By default the feed viewer 700 shows in a viewing area 712 a time-ordered list of all the update feeds received from all of the members of the user's worknet. A list widget 702 may provide a variety of list criteria (e.g., Suppliers only) to list the updated feeds of certain members. A search box 704 may receive search text so that the user can list only those members that satisfy the search text.

A user can send updates to members of the worknet using a feed control 706. For example, the user may enter text into an input box 708 to be sent as an update. The user may then select one or more members listed in the viewing area 712 as recipients of the update, and press the feed control button 706 to send the update. Updates that are sent to members may be viewed using their respective feed viewers. Non-person entities (e.g., databases, processes) may receive the update as commands (e.g., where the member that is a business process running on a computer), or simply as data to be collected and stored (e.g., where the member is a database). Updates received from a member may be automatically displayed in the viewing area 712, or may be "silenced" so that it does not appear in the viewing area at the moment but is otherwise stored for subsequent viewing.

Channels enable a user to divide their worknet into relevant subsets. Channels, therefore provide a means for a user to define a population of members (and their updates) who can share a common context. Functionality in a channel may be provided by adding to the channel computer program data objects. For example, a channel for SSM may include as a member one or more SSM-related business applications. Computer program data objects may be launched by channel members, and may collect and analyze data and generate reports, and so on. A channel may be divided into smaller channels to accommodate partitioning of tasks.

In accordance with principles of the present invention, channels may be manually defined by the user, channels may be pre-defined, channels may be derived by modifying pre-defined channels, and channels may be defined from filters. To demonstrate the idea of channels, consider in FIG. 8A, three users, A, B, and C. Each user is shown with their respective worknet, feed viewer, and aggregate data set. Thus, user A has worknet 802a comprising a set of members, a feed viewer 804a to view the updates received the members of A's worknet, and an aggregate data set 806a that represents a compilation of all the relevant data of the members of A's worknet. Similarly, user B has a worknet 802b, a feed viewer 804b, and an aggregate data set 806b. User C also has a worknet 802c, a feed viewer 804c, and an aggregate data set 806c. User A's worknet includes as its members user B and user C. It should be appreciated that the worknets of users A, B, and C do not necessarily comprise the same members.

Consider first the manual definition of a channel. Suppose A's worknet 802a includes the blog site (a data object) of a hostile blogging analyst, as a member 822. Suppose that A wants to develop a suitable response or reaction to the hostile blogs. User A may manually define a new channel 812 to deal with the blog site. In an embodiment, for example, an action item may be provided in the drop down menu 542a of the action widget 542 (FIG. 5E) to add a new channel.

a display for manually defining a channel may be modeled in accordance with FIGS. 6A and 6B. FIG. 6A may represent the set of members of the channel 812, which initially would be an empty set (i.e., no members displayed. FIG. 6B may represent the members of the user's worknet from which members of the channel may be chosen.

Figure 8B:
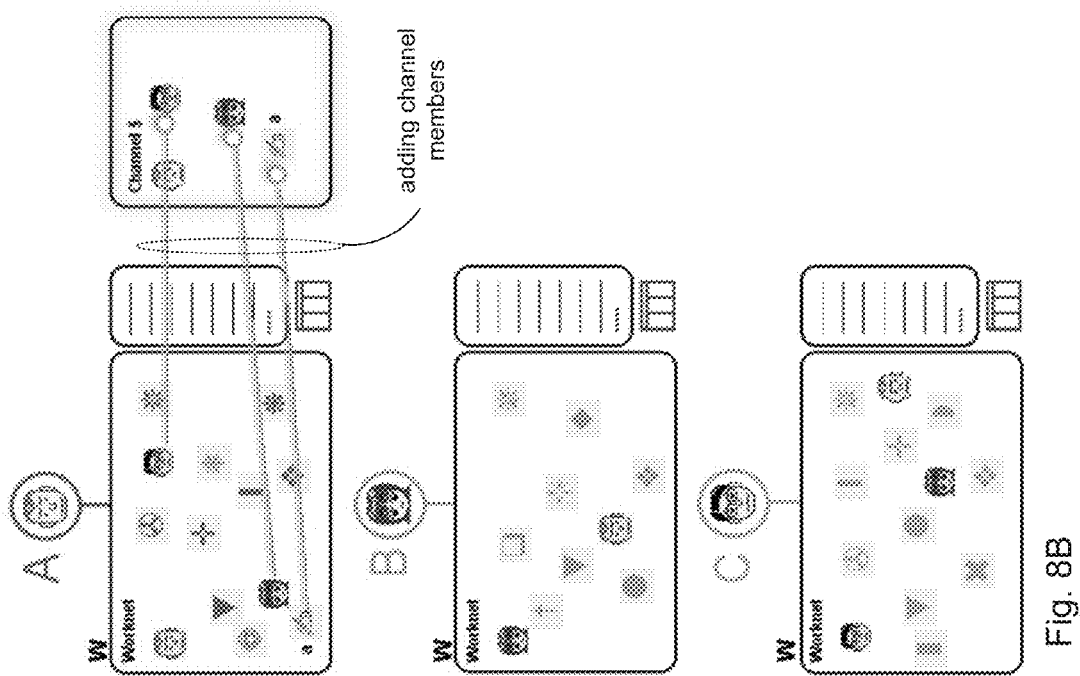

Referring to FIG. 8B, user A would add hostile blogger 822 to channel 812. User A might add user B and user C to channel 812 in order to form an action group to develop a suitable response to the blogger's hostile blogs. User A may designate the channel 812 as being OPEN or CLOSED. An open channel is open to the public. An OPEN channel is published to the global directory of data objects (see FIG. 3) as just another data object, and is visible to other users, who may join the channel. By contrast, a CLOSED channel is not open to the public, and not published to the global directory of data objects. In an embodiment, a CLOSED channel may be published to the global directory but in anonymized form so that the public cannot discern its meaning or purpose. In embodiments, the owner of a CLOSED channel or its members may add more members to the channel. In the running example, user A may elect to keep this a CLOSED channel.

Referring to FIG. 8C, the newly created channel 812 may send a notification to channel members in order to alert or otherwise inform them that they have been added to the channel. In embodiments, the SUI may automatically generate a generic notification and send it to the channel members. The user may edit an automatically generated notification to personalize or, or create a notification from scratch. The user may elect to not send the notification to some members. For example, in the running example, user A may not want the hostile blogger 822 to know that they have been added to A's channel, and so A may deleted the hostile blogger from the notification list. Users B and C may receive the notification in their respective feed viewers 804b, 804c. Although hostile blogger 822 does not receive a notification, any blogs posted on the blog site will be collected and displayed in A's feed viewer 804a.

Referring to FIG. 8D, when user A saves the channel 812, it becomes a member of A's worknet 802a. The notifications are sent to channel members on the notification list (FIG. 8C). A channel name is assigned to the channel 812; for example, "!". In accordance with the present invention, the channel 812 may be tagged with the channel name.

More generally, the channel 812 may be tagged with additional information in order to facilitate future data mining efforts. For example, years later, someone may be interested in the blog site and may want to identify anyone who was involved in dealing with the blogger. By tagging the channel with relevant information and exposing those tags to a search engine, the channel may be easily identified. A CLOSED channel may omit such tags, or may allow the tags to be searched and be anonymized if they appear in a search result. The owner of the CLOSED channel or some other authority may give permission to view the channel details.

Figure 8A:
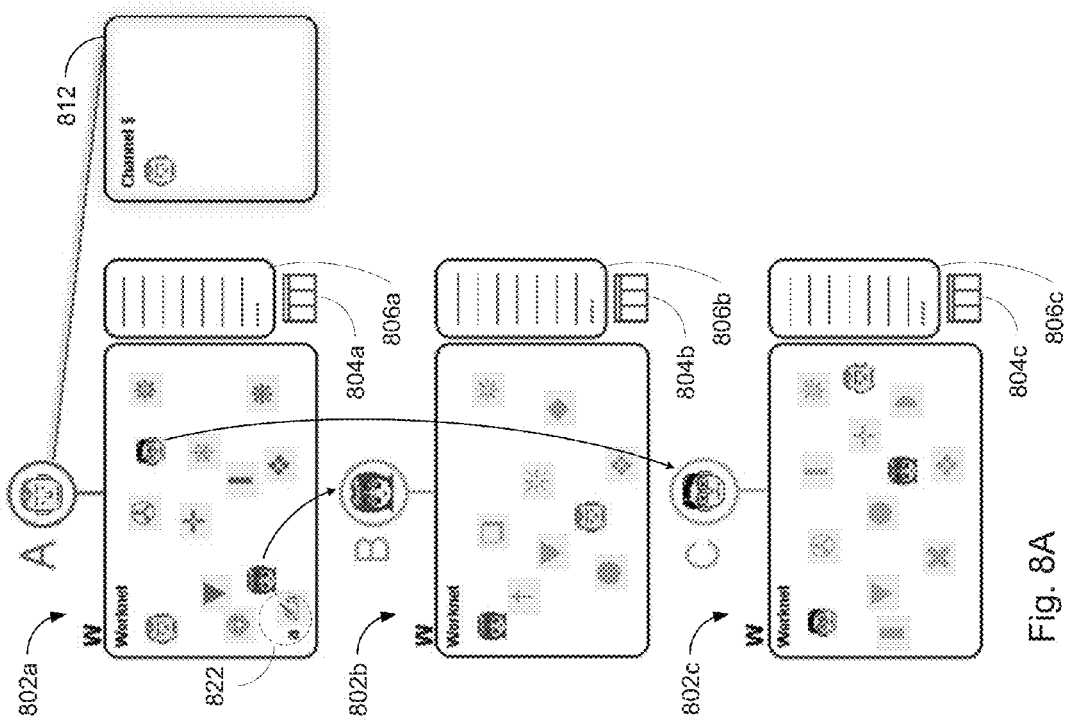
Figure 8E:
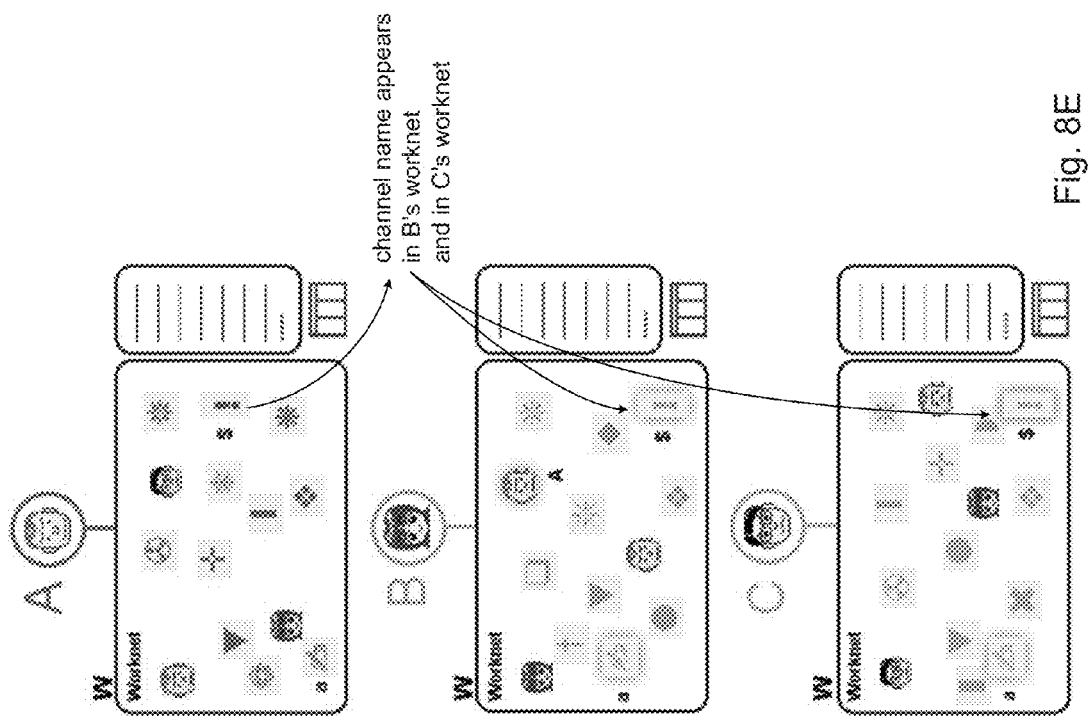

FIG. 8E illustrates that the newly created channel 812 also appears in the worknets of the channel members. In the running example, channel 812 is included as a member in user B's worknet 802b and user C's worknet 802c.

Figure 9A:
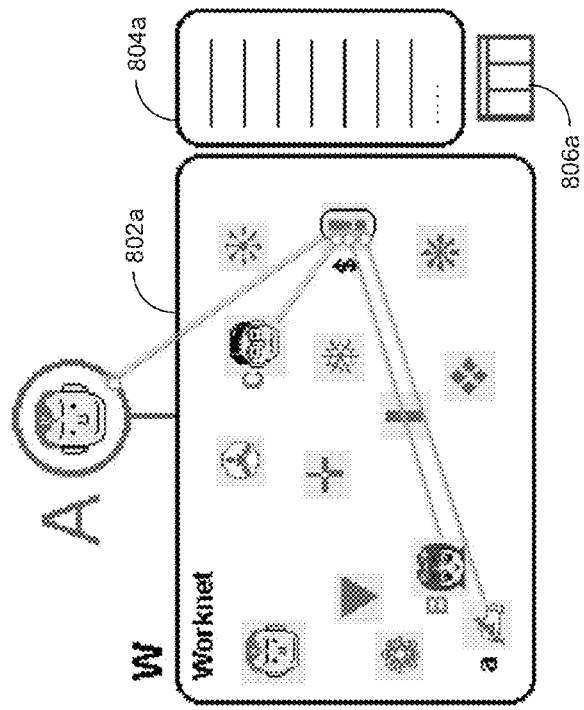
FIGS. 9A-9G depict aspects of communicating via a channel.

In embodiments, messaging of updates may occur between members, between channels, and between members and channels. Inbound updates may be received by user A directly from members of A's worknet, and viewed using feed viewer 804a. Referring to FIG. 9A, inbound updates may be received via a channel. Continuing with the running example, user A may receive updates from channel "!". When channel members of channel "!" post an update (e.g., via their respective feed viewers), their updates appear in A's feed viewer 804a as if the channel itself sent the update. The updates are automatically labeled (tagged) as being from channel "!". In embodiments, secondary identifying information such as the identity of the actual author of the update may be included in the update.

Figure 9B:
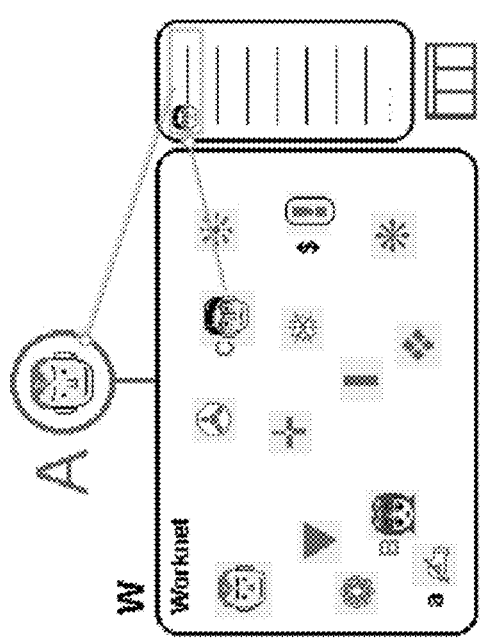

Outbound updates may be sent by user A directly to members of A's worknet via A's feed viewer 804a. A channel may be used to send updates. Referring to FIG. 9B, for example, channel "!" may serve as a sort of distribution list to deliver updates from A to the members of channel "!". Updates delivered to a member via a channel, appears in the receiving member's feed viewer as having been sent from the channel. For instance, the update may be tagged or otherwise identified by the name of the channel.

In embodiments, outbound updates may be targeted using channels. FIG. 9C, for example, illustrates the view 812 for channel "!". When user A wishes to communicate with members of channel "!", A sends an update via a feed viewer 814 associated with the channel. Each channel member will receive the update in their respective feed viewer and will appear as being from the channel but authored by A. This automatically categorizes incoming updates according to their channels. If a channel member is not listening to updates from A, but is listening to channel "!", then the channel member will receive A's update via channel "!".

Figure 9D:
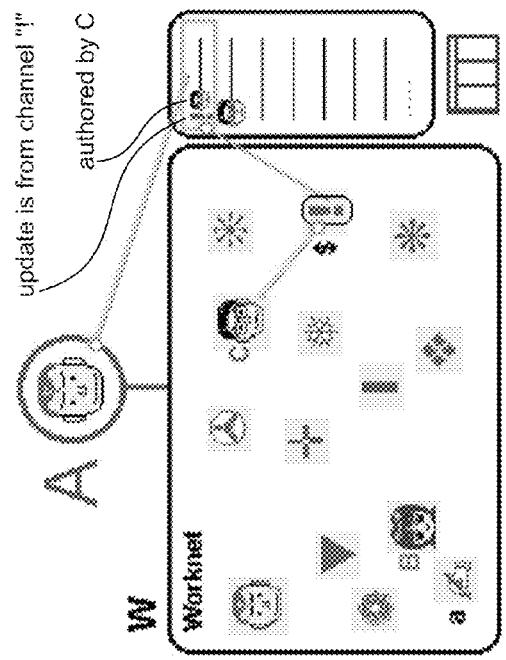
Figure 9C:
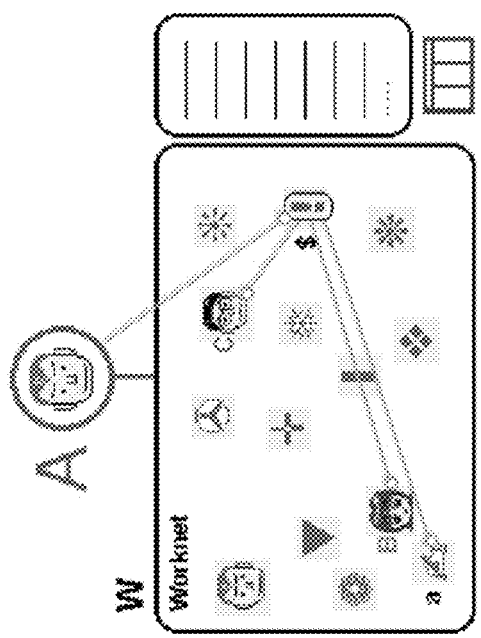

Referring to FIG. 9D, if user C sends an update to user A directly, rather than via channel "!", the update will appear in A's feed viewer 804a as being from C. This is referred to as a direct update. If A is not listening to C, then C's direct updates do not appear in A's feed viewer 804a.

Figure 9E:
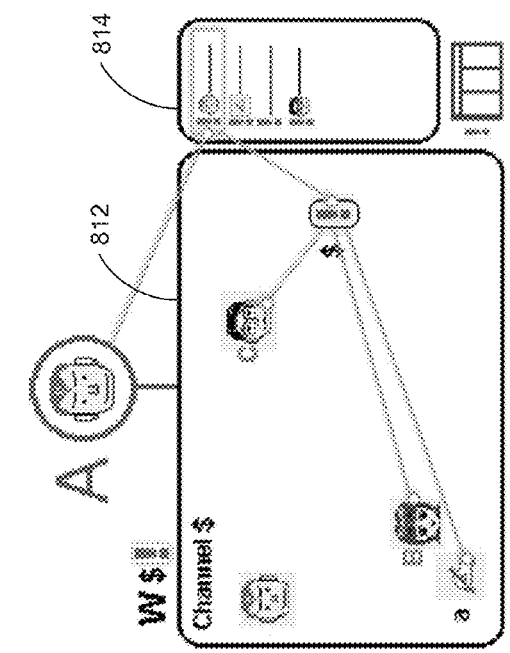

Referring to FIG. 9E, the idea of "indirect" updates refers to receiving a message via a channel. In FIG. 9E, for example, if user C sends an update to channel "!", then the update appears in A's feed viewer 804a as being sent from channel "!", but authored by c. This is referred to as an indirect update. If A is not listening to C, the update from C via channel "!" will still arrive at A's feed viewer 804a. This allows A to filter out general updates from C (by not listening to updates directly from C), but still receive updates from C as they relate to the context of channel "!". As can be seen in FIG. 9E, an indirect update may be flagged as coming from the channel (e.g., channel "!"), but also be further flagged as coming from the specific channel member who authored the update.

Figure 9F:
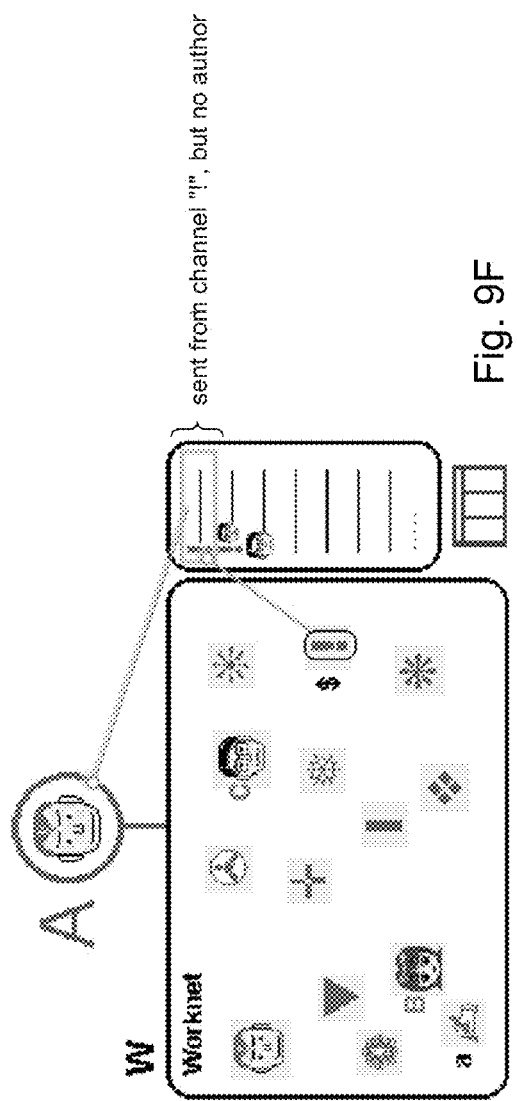

A channel itself may send updates to its members. FIG. 9F illustrates the idea of channel authored updates. In this case, the update appears as being strictly from channel itself and have no human member author. Such updates may be referred to as "channel updates," and may be batched to appear at selected intervals, such as daily or weekly. Examples of channel updates may include periodically compiled activity reports, alerts, etc.

Figure 9G:
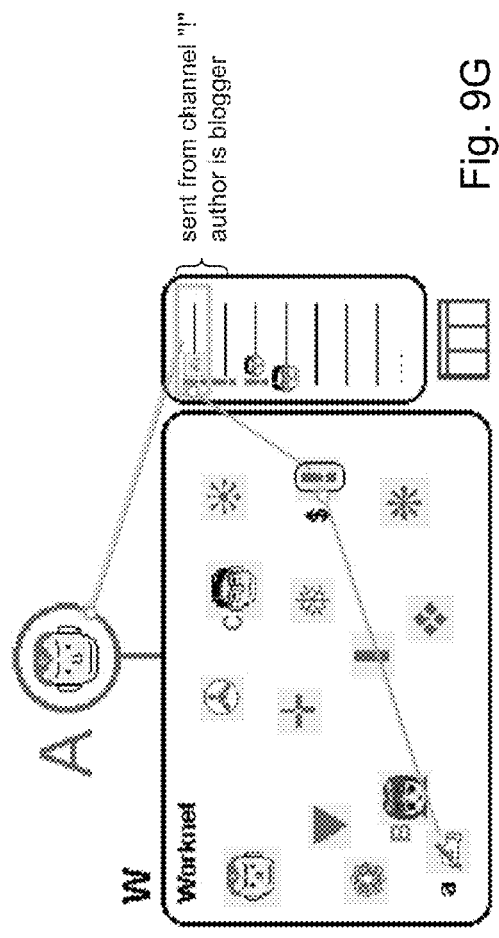

Inanimate data objects (i.e., non-person entities) in a channel may send updates just as users can. So too can third parties outside of the business enterprise 100 (external publishers), such as new outlets or individual publishers (e.g., bloggers). Referring to FIG. 9G, in the running example, member 822 represents an external publisher. Blogs posted by the member 822 may be received as updates and delivered via channel "!" with an indication that the blogger was the author.

Figure 10:
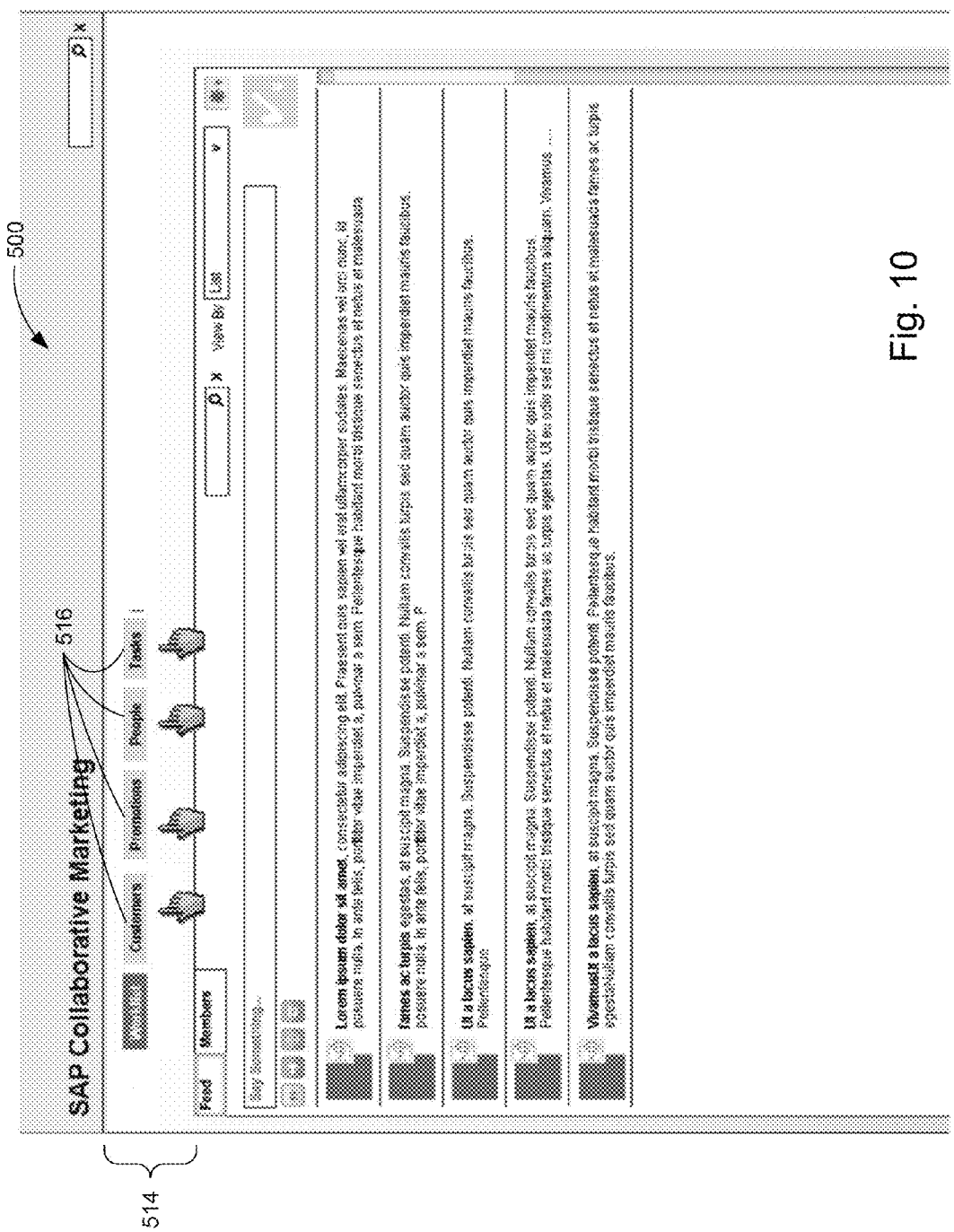
FIG. 10 illustrates a screen mockup for instantiating a channel using predefined channel definitions.

The foregoing explained the manual definition of a channel. In embodiments, preconfigured (predefined) channels may be provided in the SUI as fixed menu items. In the case of manual definition of a channel, the user starts from blank slate. As indicated in FIG. 8A, the channel 812 initially is an empty member set. By comparison, a predefined channel may include data objects from the business enterprise 100 as an initial set of members with common properties that are predetermined to be relevant to users of the channel. For example, a channel for a CRM application may be predefined with data objects such as a customer database, the sales department, and other data objects common to a CRM application. In embodiments, predefined channels may be defined off-line and then added to the user's SUI. For example, a family of CRM-related channels may be defined by the VP of sales and then deployed to sales folks in the sales group. A user may select one of the predefined channels and then customize it for their particular needs. Accordingly, in embodiments, such as shown in FIG. 10, channel buttons 516 for predefined channels may be displayed in a navigation area 514 of the member viewer window 500 of the SUI. The predefined channels may be modified or otherwise personalized and saved as a user-defined channel. Providing predefined channels may save a lot of development time to define a usable channel. Predefined channels provide a way to ensure uniform handling in a family of related tasks, and so on.

Figure 11A:
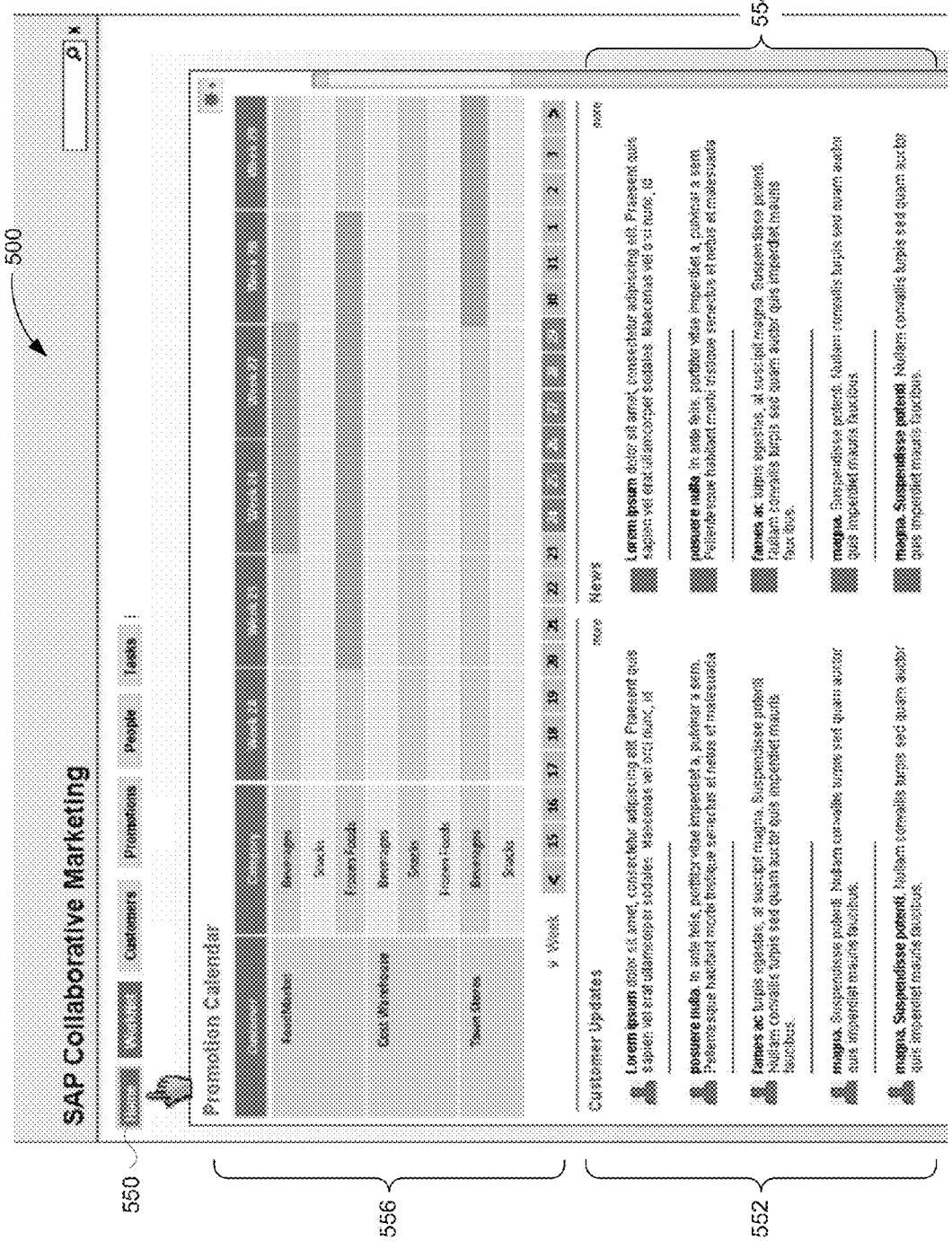
FIGS. 11A-11C illustrate screen mockups for instantiating a channel by applying filters.

Referring to FIG. 11A, worknets can be made even more accessible by exploring only content that has been filtered for relevance. In embodiments, the member viewer window 500 may include a HOME button 550 that takes the user to a homepage which may present a single-page overview of the user's relevant worknet status. The homepage may include an update area 554 to display recent updates or urgent updates. A news display area 556 may be provided to provide a list of relevant news feeds. A main display area 552 may be used to display a calendar, or pull up an analytic display, and so on.

Figure 11B:
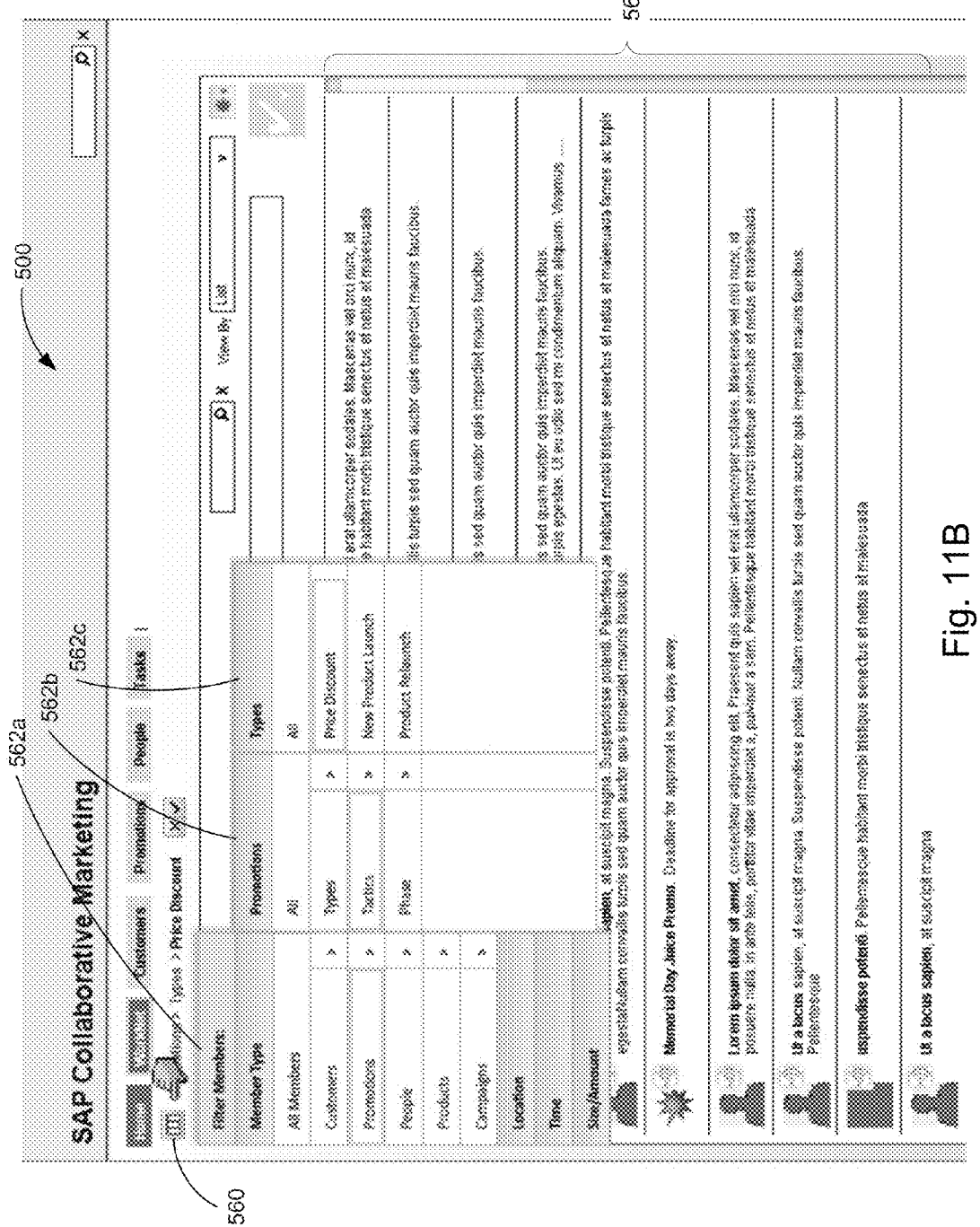

Referring to FIG. 11B, in addition to relevant information that a homepage (FIG. 11A) may provide, or the facility of predefined channels, users may still need to create views of their worknet to suit their unique organizational needs. In embodiments, search tools may be provided to assist in the exploration of their worknet to identify needed or relevant members and to discover member patterns and relationships. FIG. 11B, shows a FILTER button 560 that may be used to activate a filter on the members of the user's worknets. The FILTER button 560 may be activated to present one or more filter panes 562a, 562b, 562c to select successive filtering operations on the members of the worknet. The filter operations may be performed using one or more such panes and may be based criteria from member attributes such as type, size, location, affiliation, and so on. The resulting set of members 564 may be only those members (and their respective updates) who match the filter criteria.

Figure 11C:
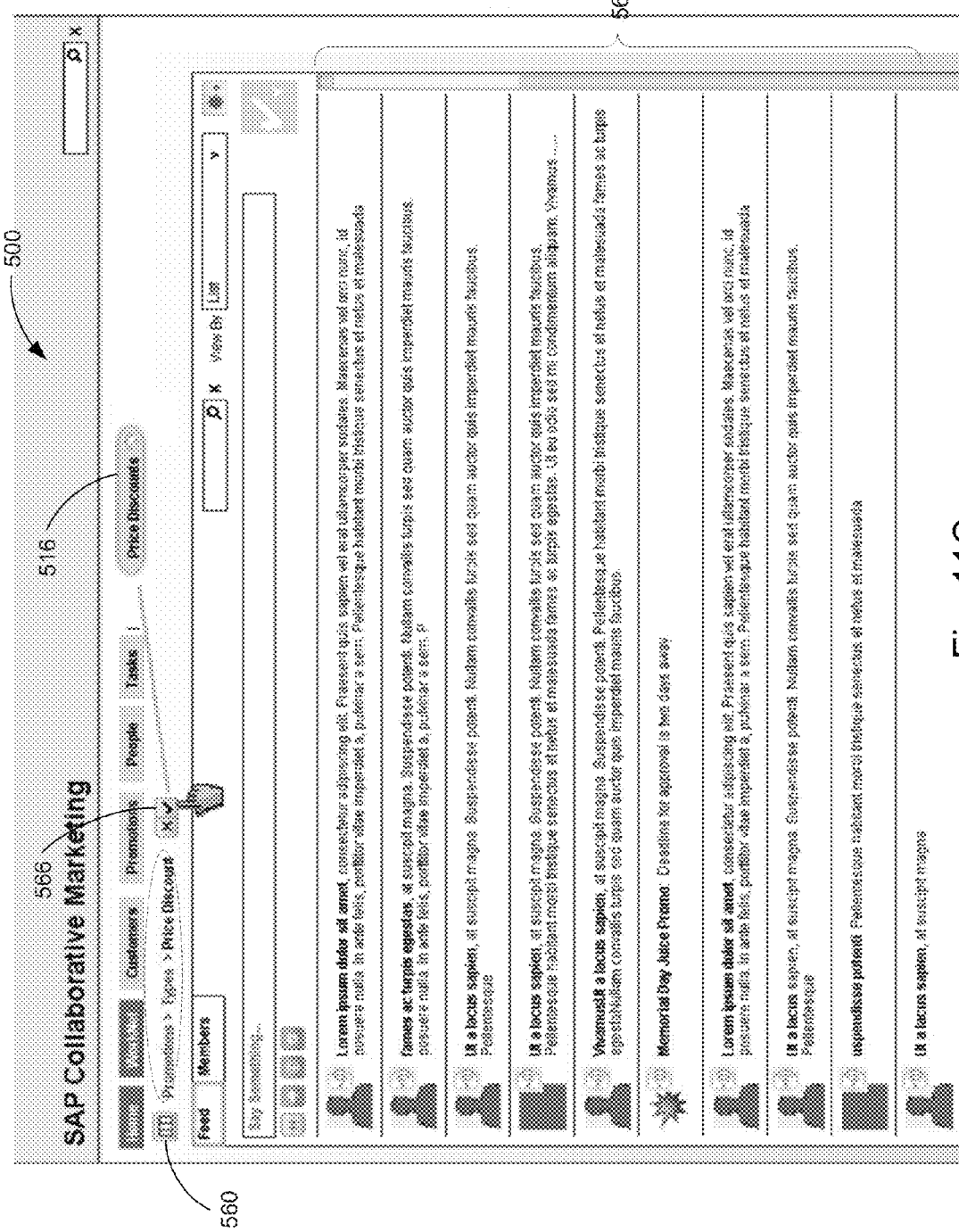

Referring to FIG. 11C, in embodiments, a CHECK button 566 may be displayed for creating a "custom" channel. If the user clicks on the CHECK button 566, a new channel is defined and the subset of members determined by the filter are inserted into the new channel. A dialogue box (not shown) may pop up to allow the user to name the channel. A button 518 may then be displayed in the navigation area to represent the created custom channel. The custom channel may then be edited over time to further customize the definition of the channel. In embodiments, the filter criteria may remain associated with the custom channel definition, so that over time members may be added or deleted as their respective attributes change over time and they either meet or no longer meet the filter criteria.

Figure 12A:
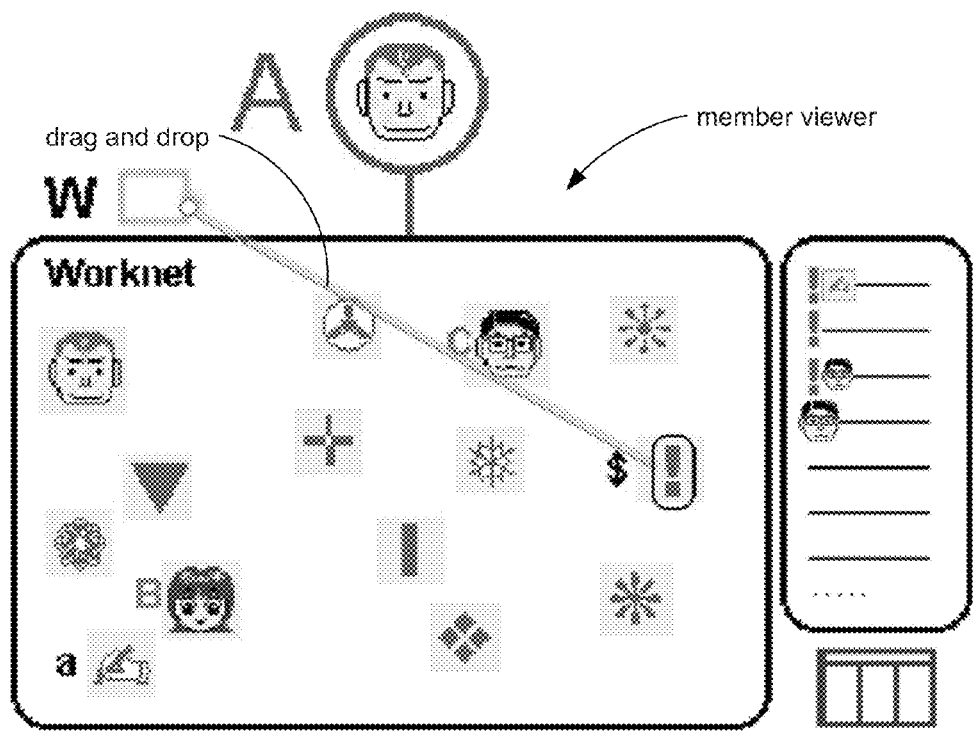
FIGS. 12A-12D illustrate navigational aspects of the SUI.
Figure 12B:
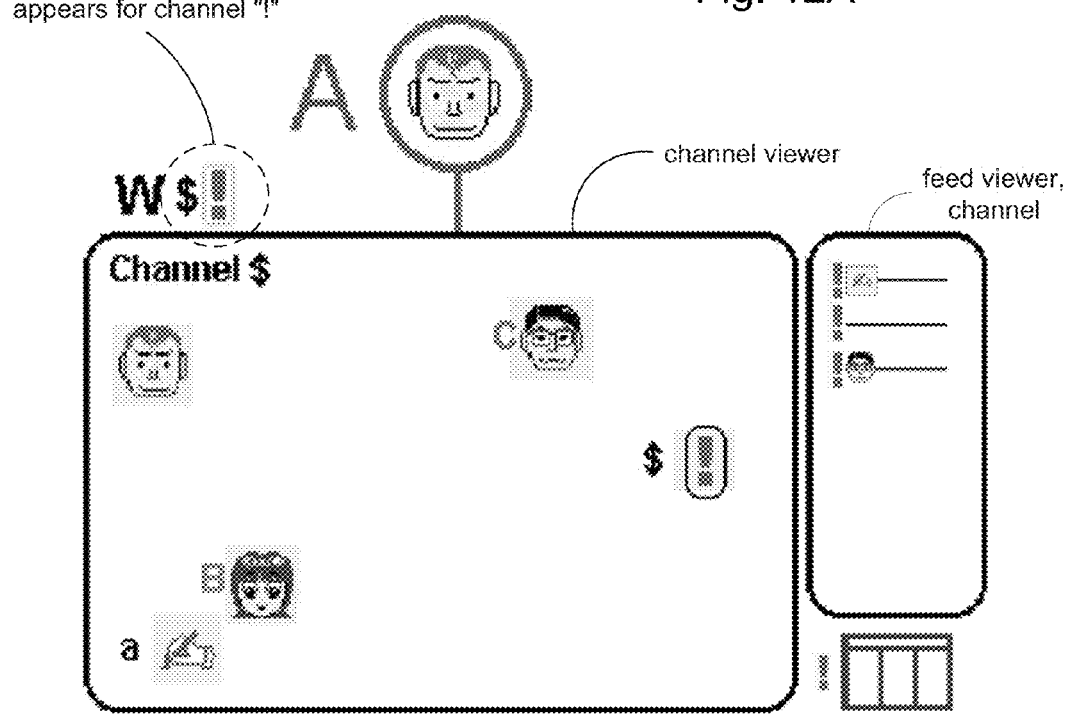

Channels can be useful for categorizing work. In order to facilitate this, in embodiments, channel shortcuts may be defined. FIG. 12A, for example, illustrates how this may be accomplished. User A may drag and drop a representation of channel "!" to a navigation area of their member viewer window. FIG. 12B shows that a button to channel "!" now appears in the navigation area. As FIG. 12B indicates, when the user clicks on the channel "!" button, a channel viewer is launched to display the details of the channel, including a corresponding feed viewer for communication of updates with the channel members. In embodiments, since a channel comprises a subset of the worknet, the channel viewer may be considered to be a member viewer 500, but is specific to members of the channel rather than to all the members of the worknet, and likewise for the channel's feed viewer.

Figure 12C:
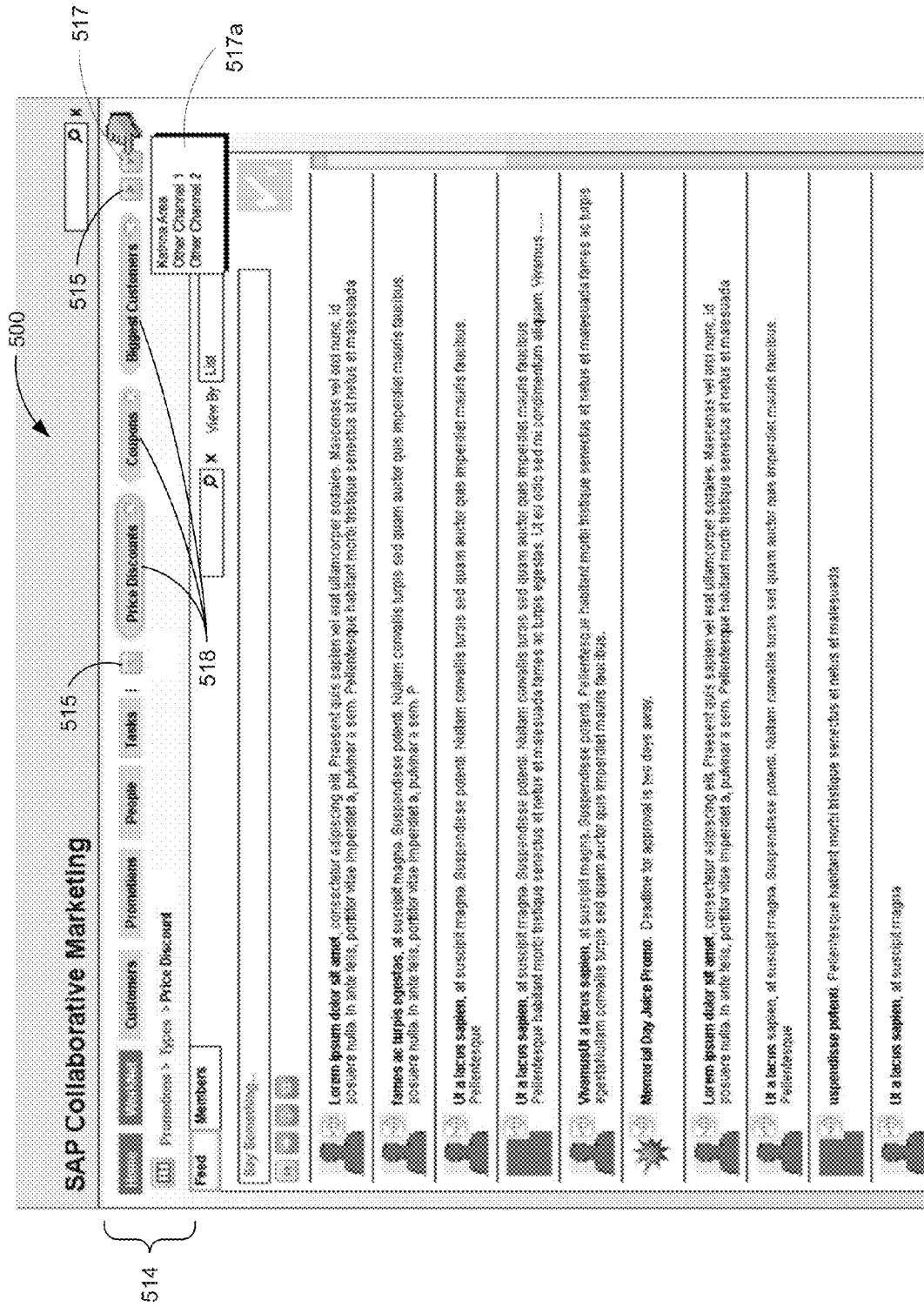

FIG. 12C illustrates an example of the member viewer window 500 displaying channel buttons in the navigation area 514. In addition to the buttons 516 for the predefined channels, buttons 518 appear for each customized channel that the user creates via the CHECK button 568, or that the user manually defines and then drags and drops into the navigation area 514 as explained above in connection with FIGS. 12A and 12B. More channel buttons 518 buttons may be produced than there is space for them. Accordingly, suitable scroll controls 515 may be presented to provide horizontal scrolling. A drop down menu 517 may be presented which lists the user-defined channels.

Figure 12D:
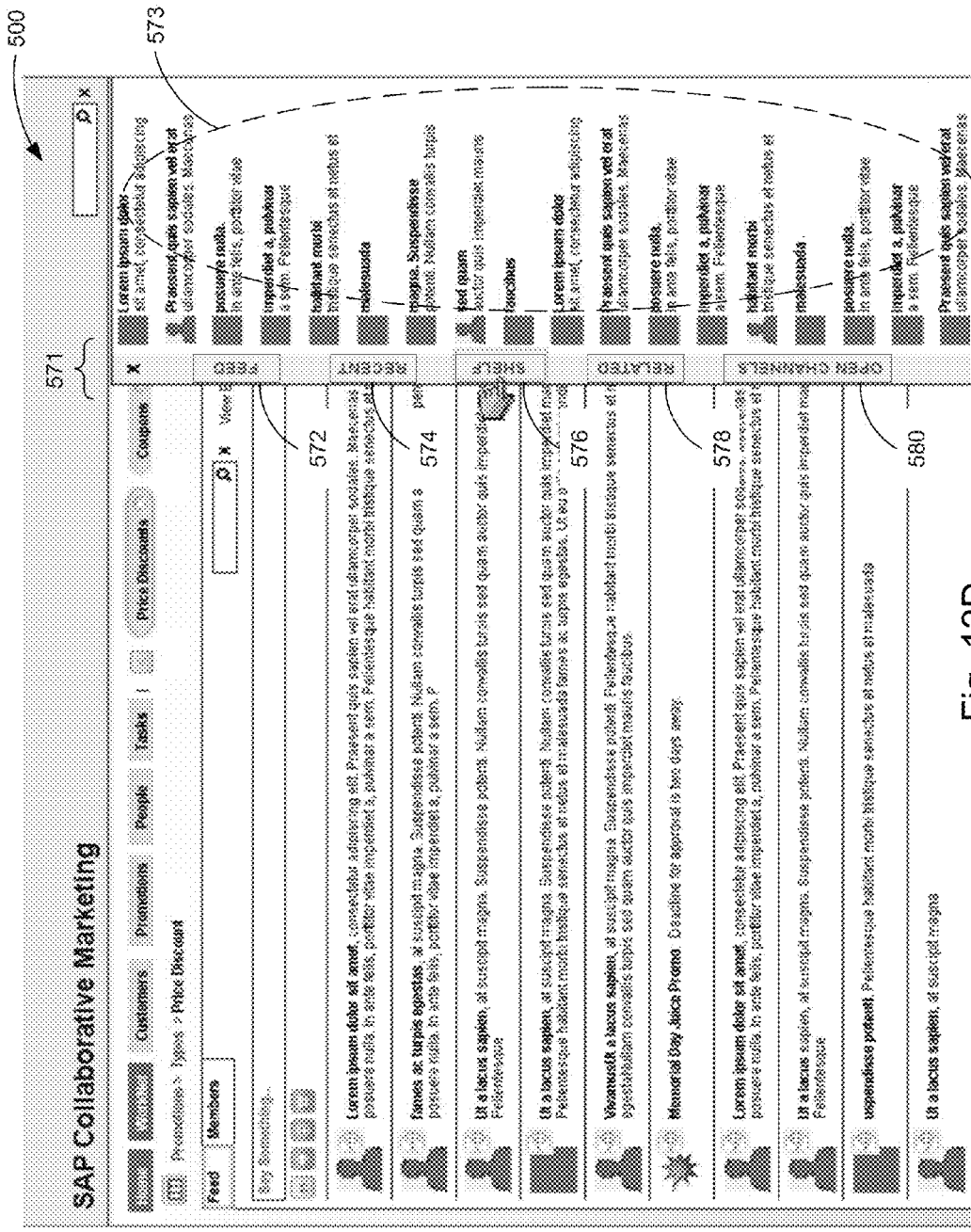

FIG. 12D illustrates additional navigational tools to facilitate a frequent user of the SUI. The member viewer display 500 presents a navigational block 570, which when activated may slide out from the right-side margin. The navigational block 570 presents a series of tabs in a tab area 571, such as a universal feeder tab 572, a history tab 574 of recently inspected data objects tab 576, a shelf tab 578 for temporary storage of data objects, and a relation engine tab 580 for displaying data objects that are deemed similar to whatever is currently selected within a view. A display area 573 displays content depending on which tab 572-580 was pressed. For example, the figure indicates the user has selected the shelf tab 576, and so a display area 573 of the navigational block 570 will display data objects that the user has previously selected and placed there.

Channels are suited for high level work organization, communication among channel members, and sharing of assets among channel members. However, managing and accomplishing actual work effort may involve smaller groups of channel members. For example, a channel may be defined to assess customer satisfaction. Channel members may include several sales groups, a connection to a CRM database, a connection to customer blogs, and so on. However, for focused collaborative efforts such as gathering feedback from several sales regions may require a group for each sales region. Decision-making may require only a small set of channel members (e.g., just the account managers), and so on.

Figure 13A:
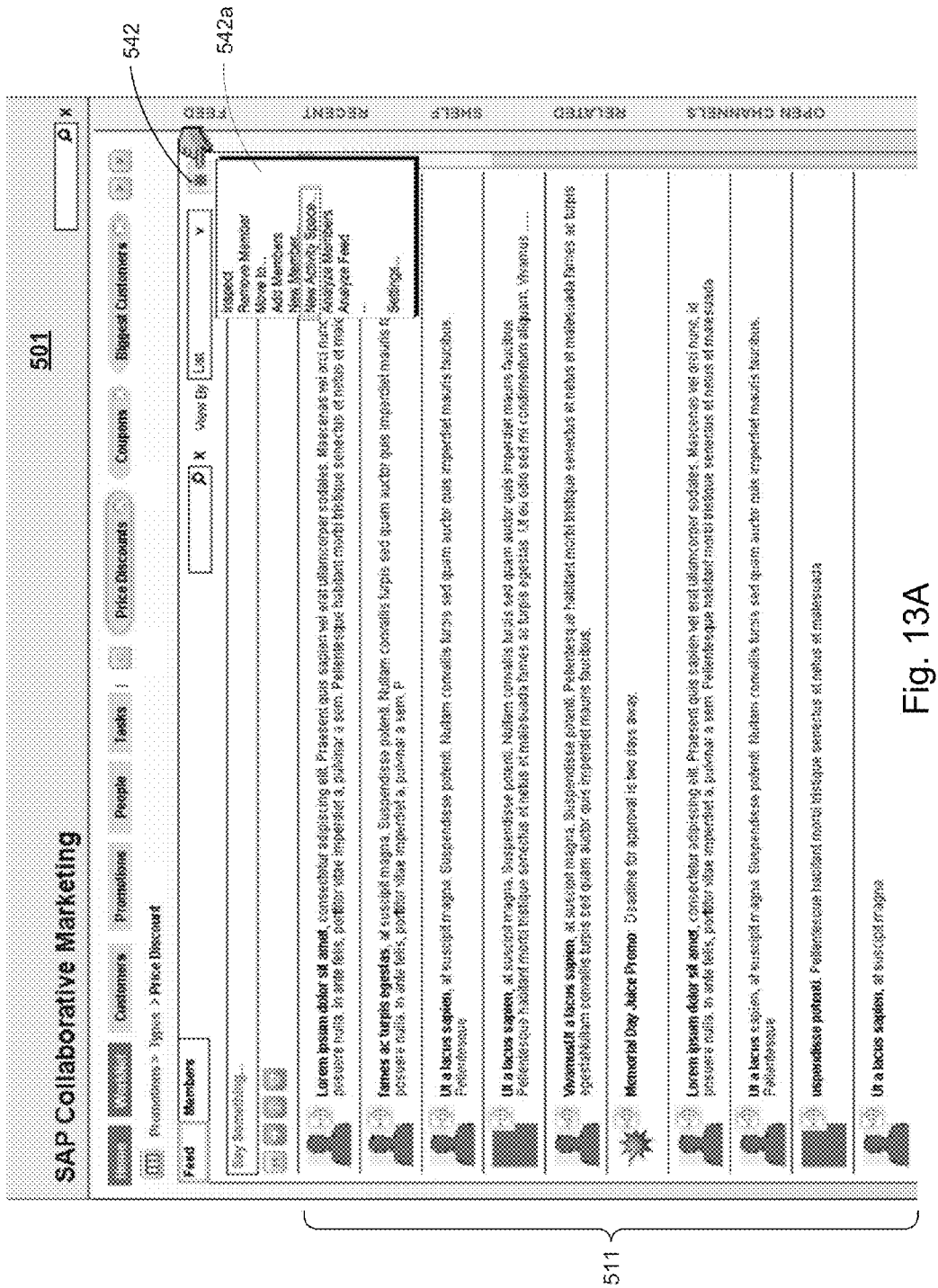

Referring to FIG. 13A, in embodiments, members in a channel may create activity spaces within the channel. Activity spaces may provide specific tools targeted at short-term issue resolution. Tools may include collaborative tools to facilitate collaboration among members in an activity space, or decision making tools, and so on. FIG. 13A illustrates an example of a channel viewer window 501, which in embodiments may appear similar to a member viewer window 500 since channels are subsets of the worknet. A display area 511 lists the channel members. A drop down menu 542a from the action widget 542 in the channel viewer window 501 reveals a New Activity Space action item.

Figure 13B:
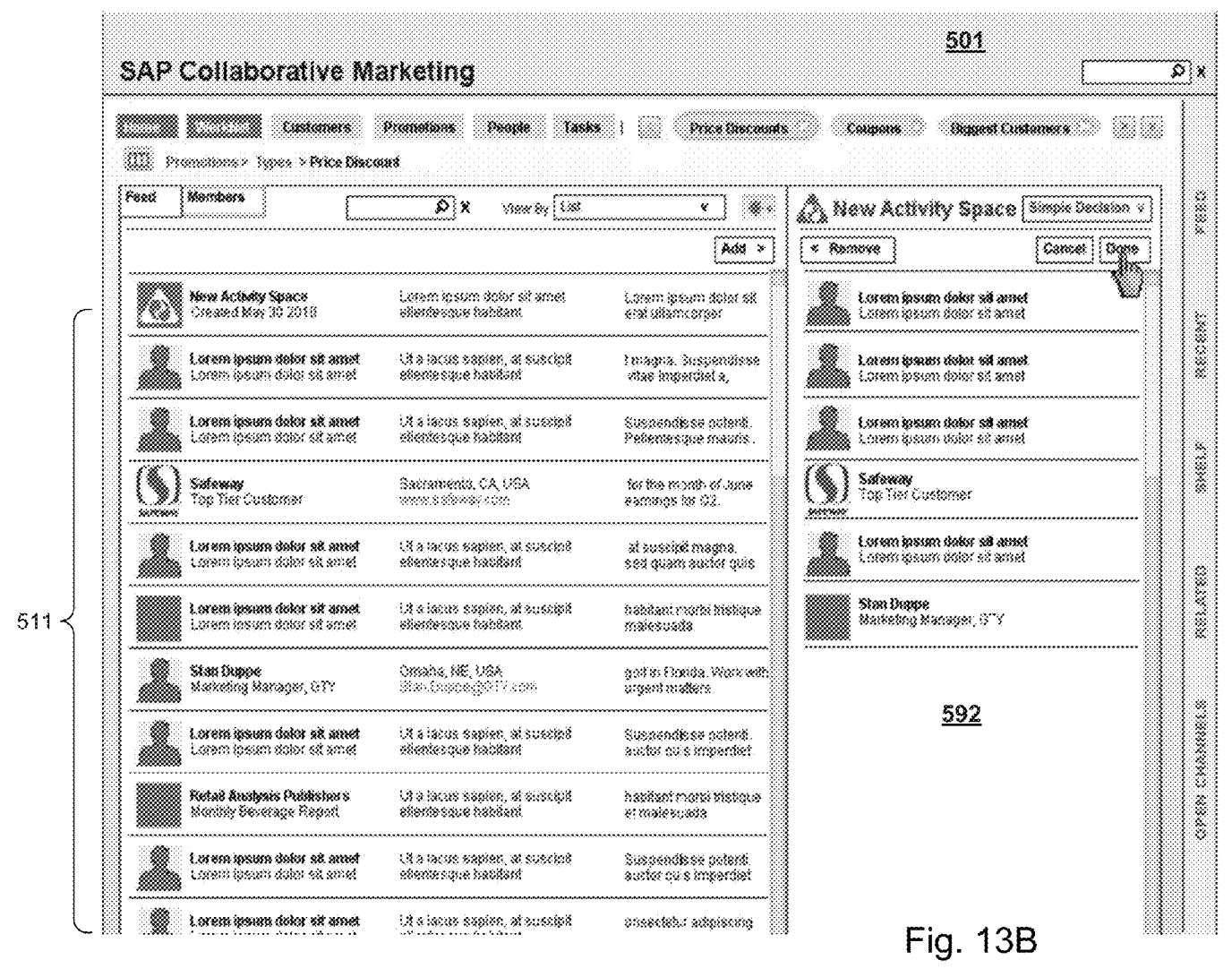

Referring to FIG. 13B, if a channel member user selects the New Activity Space action item from their channel viewer window 501, the display may include an activity definition window 592 as illustrated in the figure. There, the channel member user may add members from the parent channel to the activity space by dragging channel members from the display area 511 and dropping them into the activity definition window 592. When the channel member is done, they may click on the DONE button and the activity definition window 592 disappear.

Figure 13C:
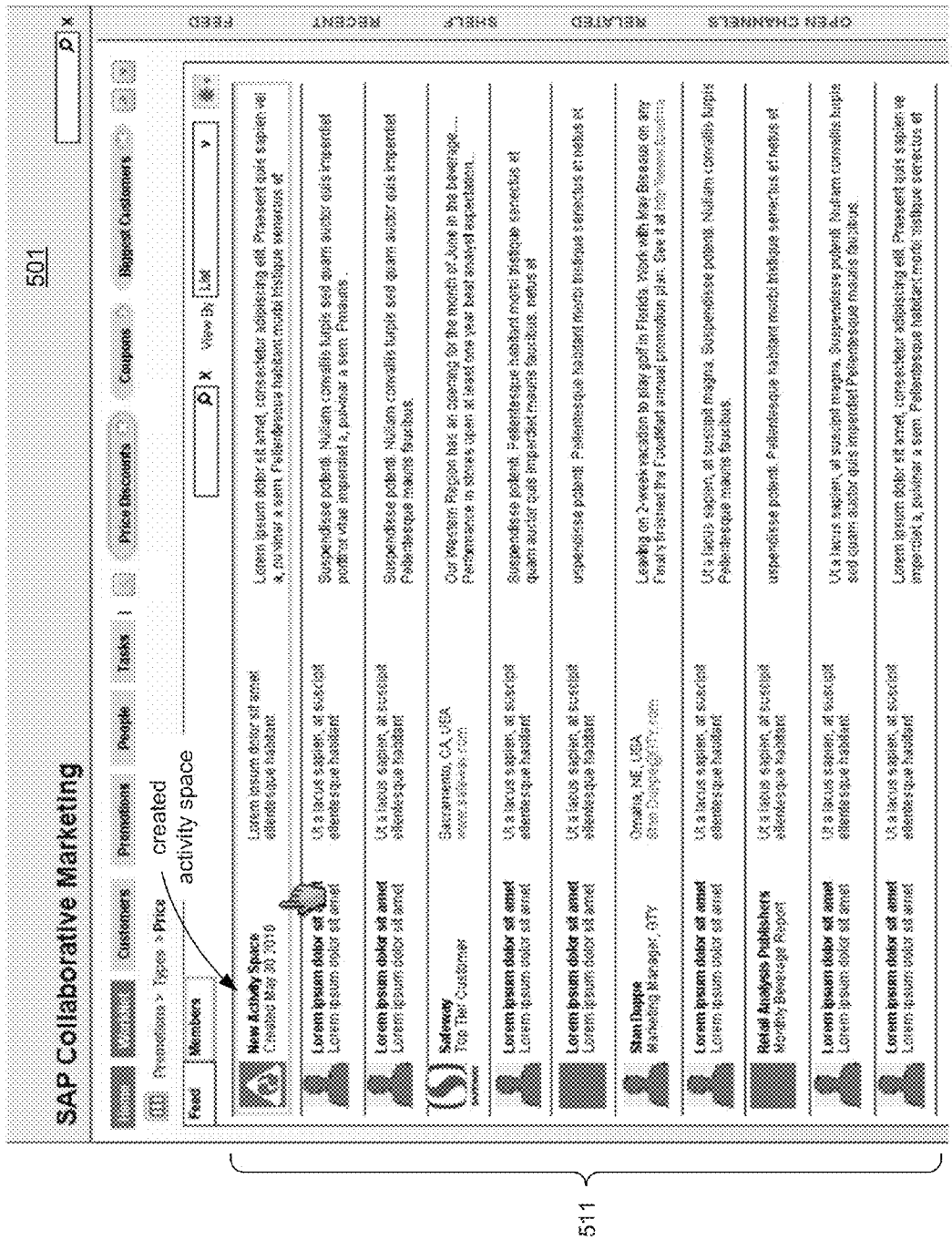
Figure 13D:
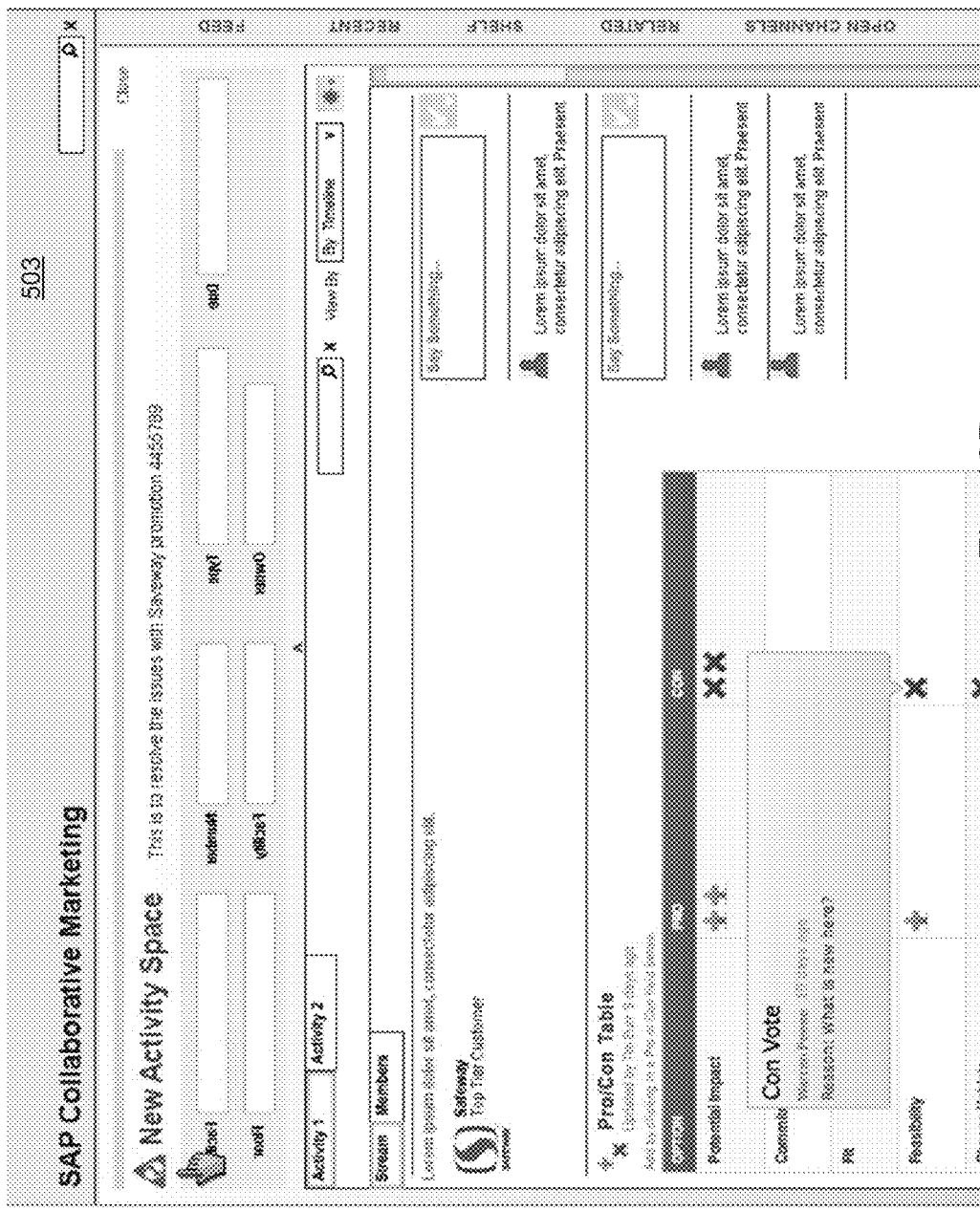

FIG. 13C illustrates that the created activity space may appear in the display area 511 of the channel viewer window 501 as a channel member. The activity space has its own viewer. In embodiments, a user may double click on the image of the activity space in the display area 511 to invoke an activity space viewer 503, such as shown in FIG. 13D for example. The specific details of an activity space may vary from one activity to the next. Different tools may be provided, and so on. In an illustrative embodiment, the activity space viewer 503 may borrow from a StreamWork™ instance; the StreamWork™ application is a collaboration tool developed, produced, and sold by the assignee of the instant disclosure.

Figure 14A:
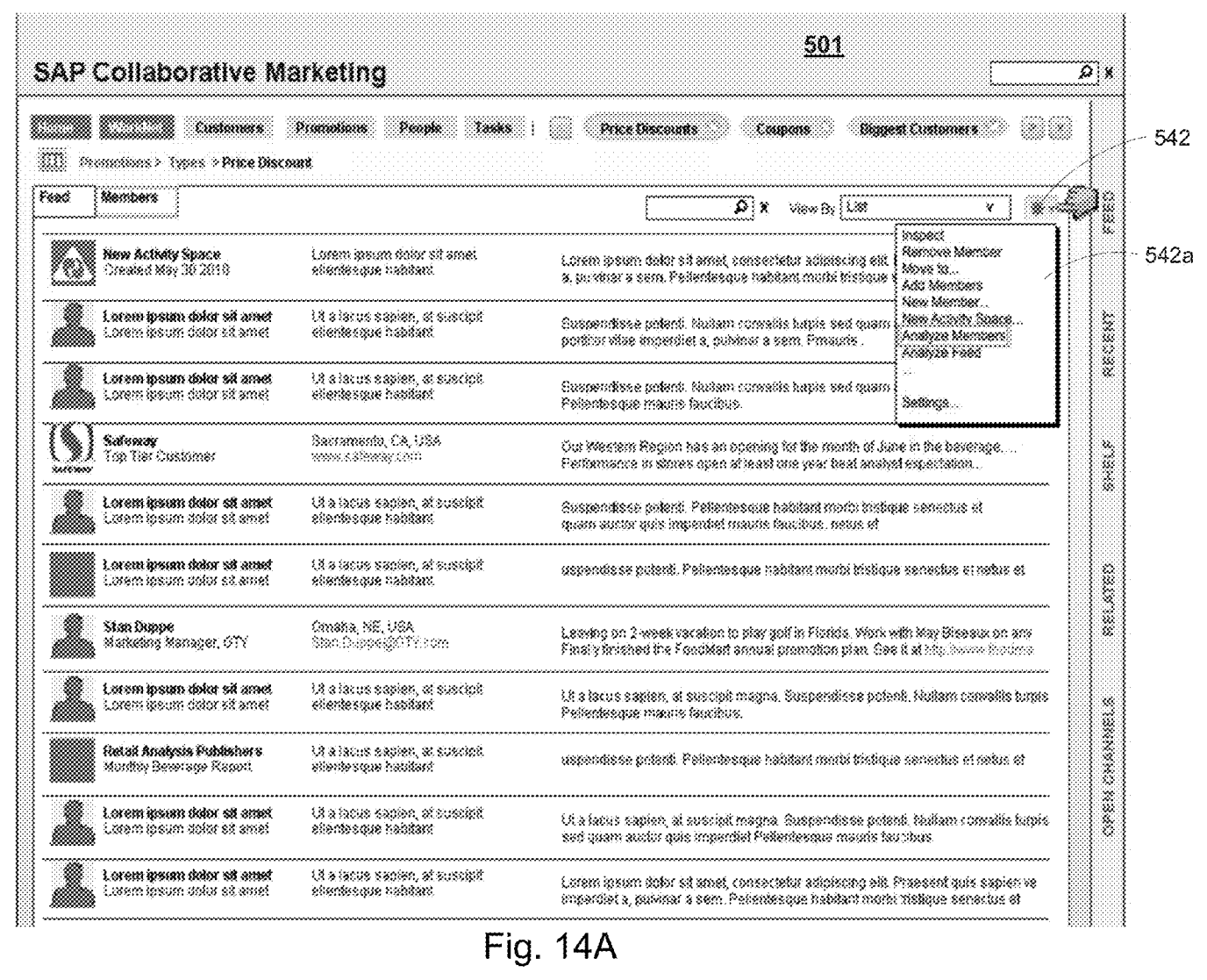

In embodiments, the information in a user's worknet or a channel can be analyzed in several ways. FIG. 14A, for example, shows the channel viewer window 501, where a channel member user has activated the action widget 542. The resulting drop down menu 542a of action items shows an Analyze Members action item. This action item may be a context sensitive, in that "members" being analyzed will depend on the viewer from which the action widget 542 was invoked. For example, in FIG. 14A, the action widget 542 was invoked from the channel viewer window 501. Accordingly, the "members" that would analyzed would be members of the channel being displayed in the channel viewer window 501. If the action widget 542 was invoked from the member viewer window 500 (e.g., FIG. 5A), then the "members" that would be analyzed would be members of the user's worknet. FIG. 14A shows that other parts of the worknet may be analyzed. For example, the drop down menu 542a shows an Analyze Feed action item.

Figure 14B:
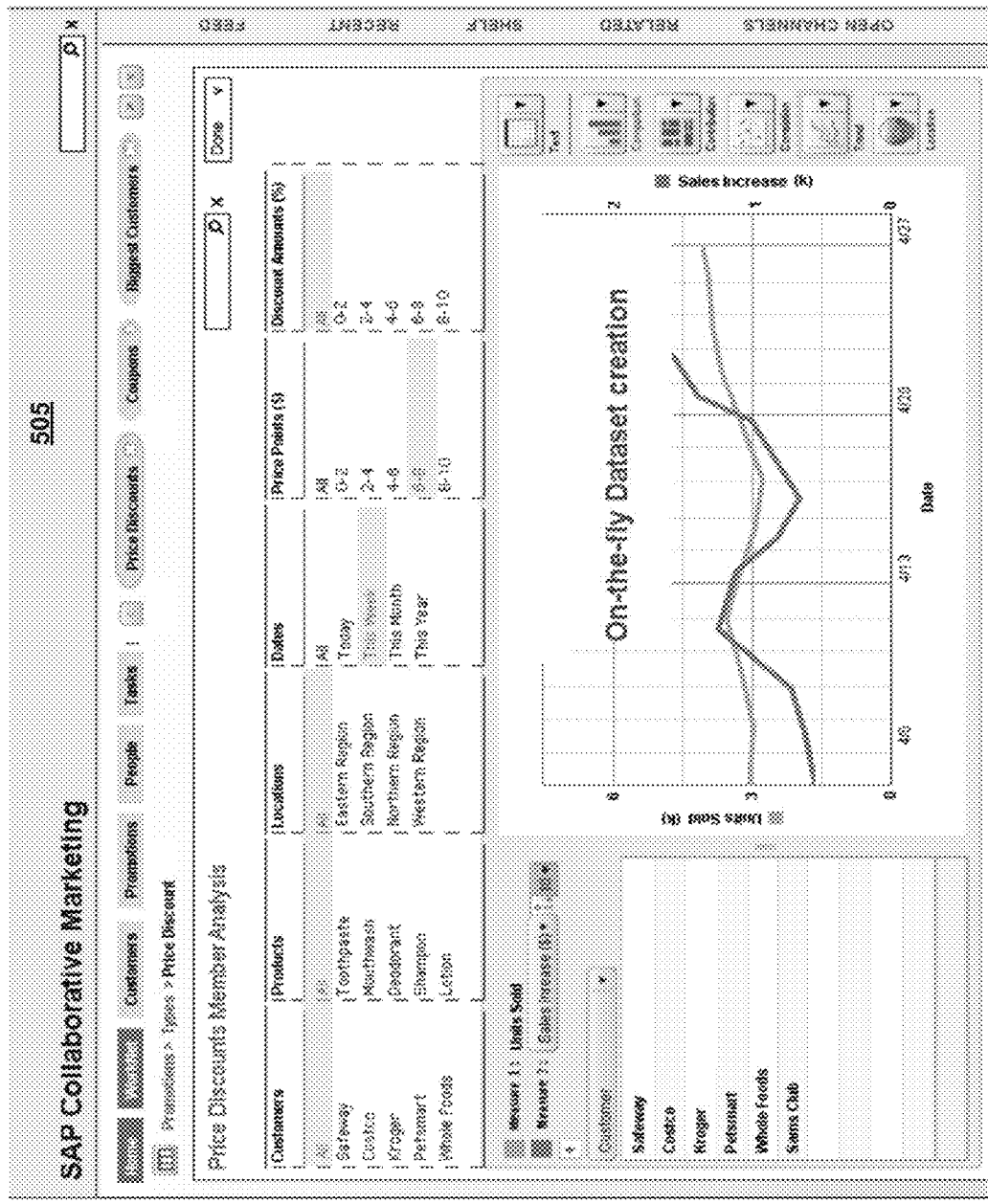
Figure 14C:
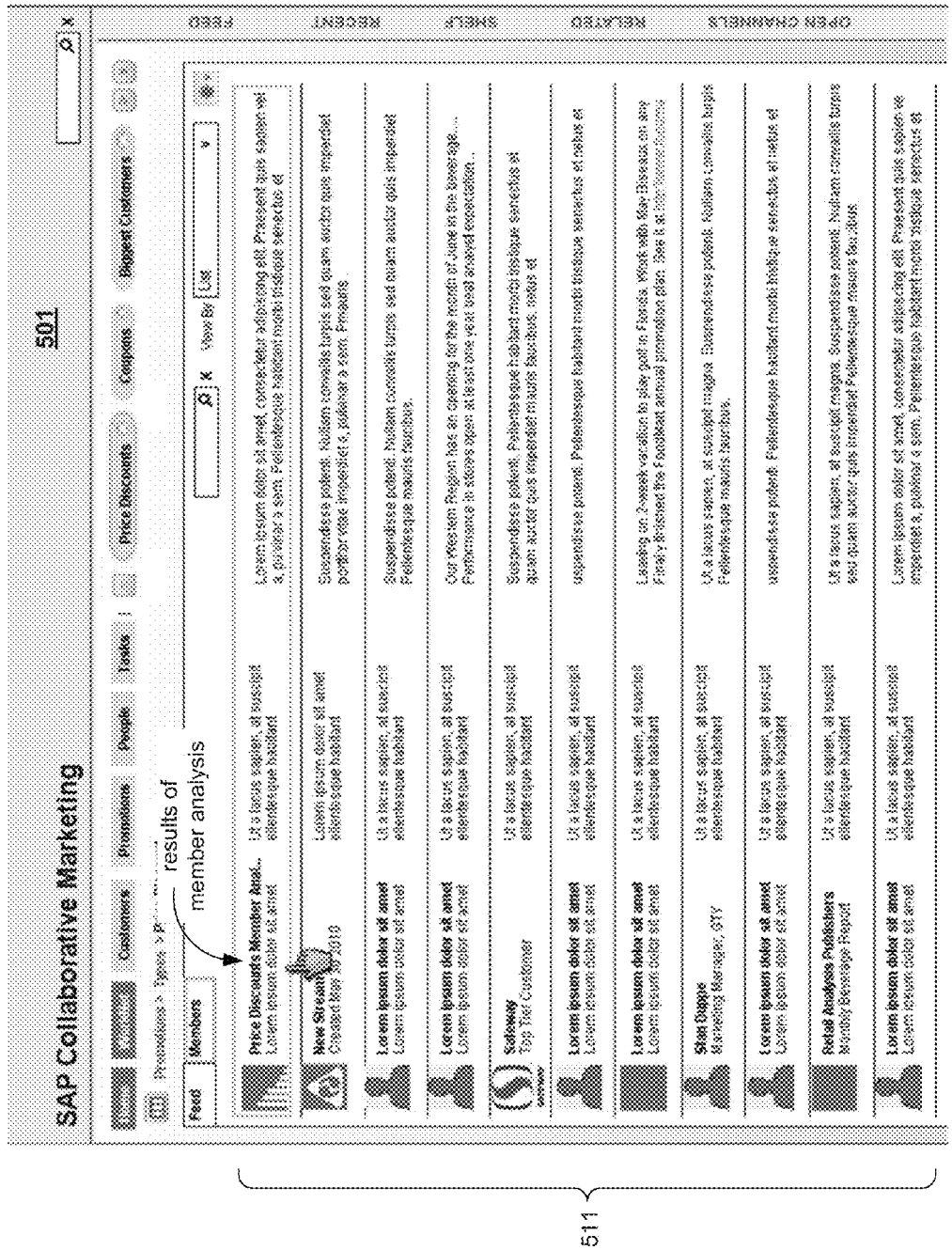

FIG. 14B illustrates that an analysis window 505 may be invoked when an Analyze action item is selected from the drop down menu 542a. In FIG. 14B, the analysis window 505 is for member analysis. However, it can be appreciated that a similar window may be provided with feed analysis, and so on. The specific functionality provided in an analysis window will depend on the nature of the information being analyzed and the desired outputs. A DONE button allows the user to save any results of the analysis. As can be seen in FIG. 14C, the results may be added to the channel, or activity space, etc. as another member, and may appear the viewer. Thus, for example, FIG. 14C shows a channel viewer window 501 listing in its display area 511, results of the member analysis as just another member of the channel.

Figure 15A:
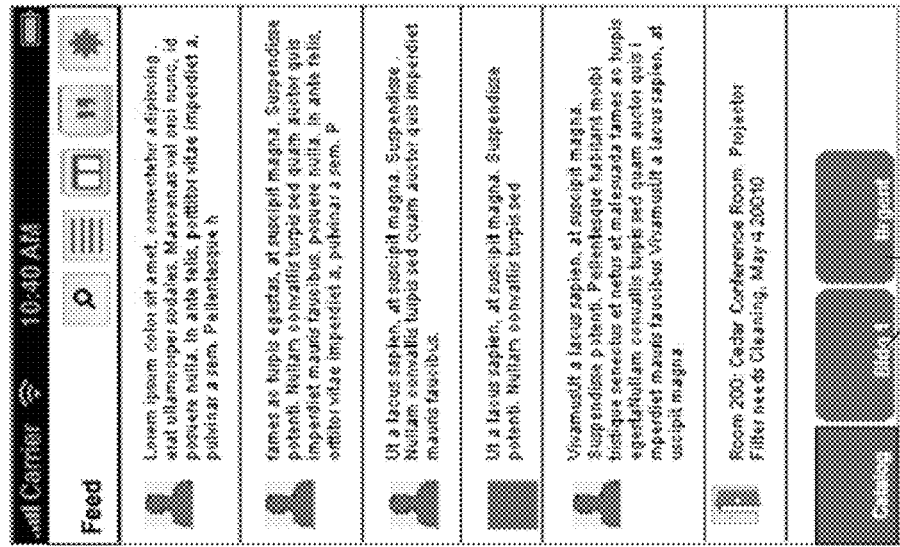
Figure 15B:
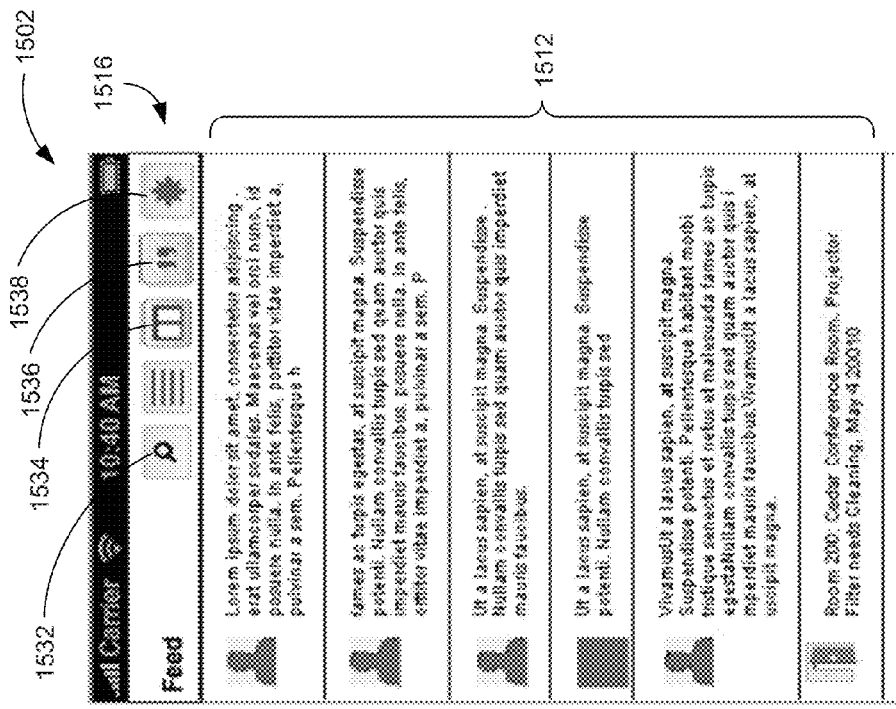

In some embodiments, the SUI may be provided on a mobile device. FIGS. 15A-15F depict a sampling of screen shots illustrating how the displays may appear on a mobile device. FIGS. 15A and 15B, for example, show a member viewer 1502 listing in a display area 1512 member of a user's worknet. A selection area 1514 can be swiped horizontally as in an iPhone® mobile device to reveal a selection of pre-defined channels 1522 and user-defined channels 1524. An action area 1516 presents various action tools such as searching 1532, feed viewer button 1534, filtering 1536, and an action widget 1538.

Figure 15D:
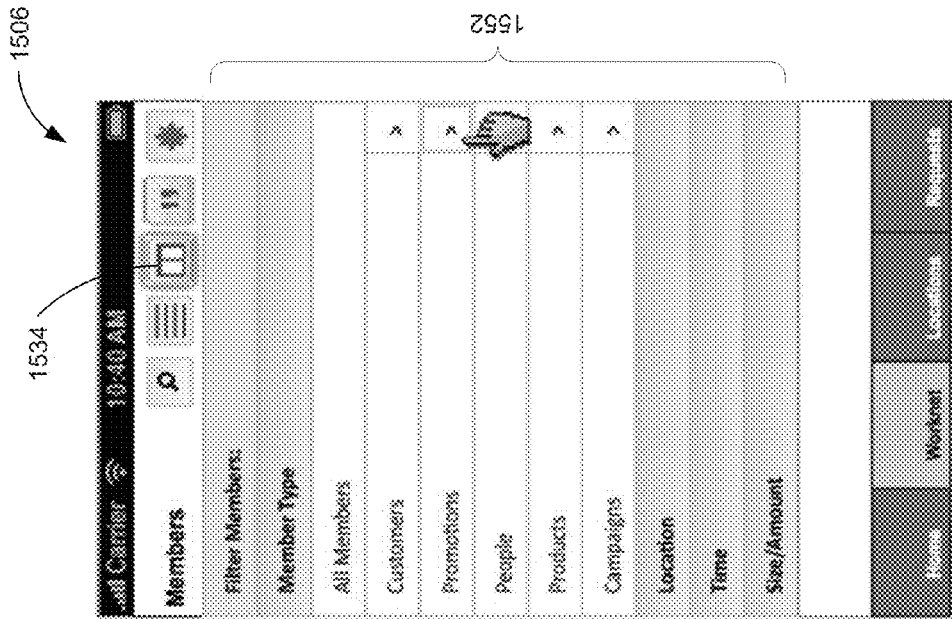
Figure 15C:
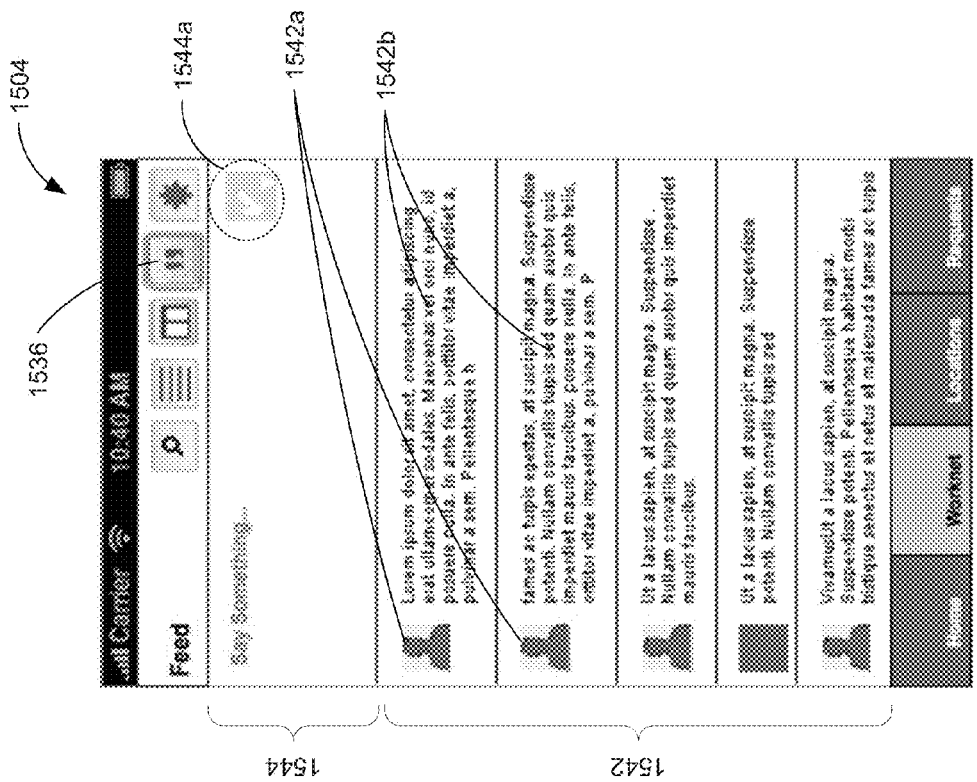

FIG. 15C shows an example of a feed viewer 1504 that can be invoked if the user "taps" on a feed viewer button 1534 for viewing received updates and sending updates. A viewing area 1542 provides a list of members 1542a along with updates 1542b received from the members. A input area 1544 allows a user to enter text. The user may tap on one or more members in the viewing area 1542 to select recipients of the text. A SEND button 1544a (shown grayed out in FIG. 15C) will highlight when text is entered into the input area 1544, allowing the user to send (e.g., by tapping on the SEND button) the text as an update from the user to the recipients.

FIGS. 15D and 15E illustrate an example of a filter 1506 that may be invoked when the user taps on the filtering button 1536. The user may conduct exploratory filtering of their worknet or channel. The menus 1552 may slide out (FIG. 15E) to reveal sub-menus 1554 and collapse to allow the user to conduct a filtering operation. FIG. 15F shows a result set 1556 due to the filtering. A CHECK button 1558 may be provided to allow the user to save the result set 1556 as a custom channel.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for networking among data objects of a business enterprise comprising operating a computer system to perform steps of:
    receiving, at a computing device, input from a worknet creator to define an initial worknet including receiving input indicative of a plurality of data objects of a business enterprise as members of the initial worknet, including data objects representative of persons in the business enterprise and at least one data object representative of a first worknet subset;
    receiving input from the worknet creator that identifies one or more members of the initial worknet to create a second worknet subset ("worknet subset"), including the computing device:
    instantiating the worknet subset;
    updating the initial worknet by adding the worknet subset as a data object in the initial worknet;
    displaying a representation of the updated initial worknet including displaying a representation of the worknet subset along with a representation of the members of the initial worknet;
    displaying a representation of the worknet subset in worknets of other users who are members of the worknet subset; and
    sending a notification to the members of the worknet subset,
    wherein the worknet subset becomes a data object of the business enterprise and is included in a global view of the data objects of the business enterprise;
    displaying a first feed viewer associated with the members of the worknet, the first feed viewer presenting communications to and from the members of the worknet;
    displaying a second feed viewer, separate from the first feed viewer, associated with members of the worknet subset, the second feed viewer presenting communications to and from the members of the worknet subset; and
    defining an activity space, separate from the first feed viewer and the second feed viewer, that is associated with the worknet subset, the activity space comprising a subset of the members of the worknet subset as members of the activity space, and one or more collaboration tools to facilitate activities among the members of the activity space.

2. The method of claim 1 wherein instantiating a worknet subset includes selecting the worknet subset from among a plurality of predefined channel definitions, wherein each predefined channel definition identifies a subset of members of the worknet to include as the members of the worknet subset.

3. The method of claim 1 wherein instantiating a worknet subset includes applying one or more filtering operations to identify a resulting subset of members of the worknet, wherein the resulting subset of members of the worknet are included as the members of the worknet subset.

4. The method of claim 1 wherein the notification is automatically generated and sent to the members of the worknet subset.

5. The method of claim 1 wherein sending a notification includes receiving input from the worknet creator and incorporating the received input in the notification.

6. The method of claim 1 wherein sending a notification includes receiving input from the worknet creator to omit sending the notification to one or more members of the worknet subset.

7. The method of claim 1 wherein the computer system is a mobile device.

8. A programmed computer system configured to provide networking among data objects of a business enterprise, the programmed computer system comprising:
    a processing component;
    a display component;
    a memory component having stored thereon computer executable program code,
    wherein when the processing component executes the computer executable program code, the processing component:

receives input from a worknet creator to define an initial worknet the input indicative of a plurality of data objects of a business enterprise as members of the initial worknet, including data objects representative of persons in the business enterprise and at least one data object representative of a first worknet subset;

receives input from the worknet creator that identifies one or more members of the initial worknet to create a second worknet subset ("worknet subset"), including the processing component:

instantiating the worknet subset;

updating the initial worknet by adding the worknet subset as a data object in the initial worknet;

displaying a representation of the updated initial worknet including displaying a representation of the worknet subset along with a representation of the members of the initial worknet;

displaying a representation of the worknet subset in worknets of other users who are members of the worknet subset; and sending a notification to the members of the worknet subset, wherein the worknet subset becomes a data object of the business enterprise and is included in a global view of the data objects of the business enterprise;

displays on the display component a first feed viewer associated with the members of the worknet, the first feed viewer presenting communications to and from the members of the worknet;

displays on the display component a second feed viewer, separate from the first feed viewer, associated with members of the worknet subset, the second feed viewer presenting communications to and from the members of the worknet subset; and receives input from the worknet creator to define an activity space, separate from the first feed viewer and the second feed viewer, that is associated with the worknet subset, the activity space comprising a subset of the members of the worknet subset as members of the activity space, and the activity space comprising one or more collaboration tools to facilitate activities among the members of the activity space.

9. The computer system of claim 8 wherein the processing component instantiates a worknet subset by receiving from the worknet creator a selection of one of a plurality of predefined channel definitions, wherein each predefined channel definition identifies a subset of members of the worknet to include as the members of the worknet subset.

10. The computer system of claim 8 the processing component instantiates a worknet subset by receiving input from the worknet creator one or more filtering operations to identify a resulting subset of members of the worknet, wherein the resulting subset of members of the worknet are included as the members of the worknet subset.

11. The computer system of claim 8 wherein sending a notification includes receiving input from the worknet creator to omit sending the notification to one or more members of the worknet subset.

12. A computer program product comprising a non-transitory computer readable medium having stored thereon computer executable program code, the computer executable program code configured to cause a computer system to perform steps of:

receiving, at a computing device, input from a worknet creator to define an initial worknet including receiving input indicative of a plurality of data objects of a business enterprise as members of the initial worknet, including data objects representative of persons in the business enterprise and at least one data object representative of a first worknet subset;

receiving input from the worknet creator that identifies one or more members of the initial worknet to create a second worknet subset ("worknet subset"), including the computer system:

instantiating the worknet subset;

updating the initial worknet by adding the worknet subset as a data object in the initial worknet;

displaying a representation of the updated initial worknet including displaying a representation of the worknet subset along with a representation of the members of the initial worknet;

displaying a representation of the worknet subset in worknets of other users who are members of the worknet subset; and sending a notification to the members of the worknet subset, wherein the worknet subset becomes a data object of the business enterprise and is included in a global view of the data objects of the business enterprise;

displaying a first feed viewer associated with the members of the worknet, the first feed viewer presenting communications to and from the members of the worknet;

displaying a second feed viewer, separate from the first feed viewer, associated with members of the worknet subset, the second feed viewer presenting communications to and from the members of the worknet subset; and defining an activity space, separate from the first feed viewer and the second feed viewer, that is associated with the worknet subset, a subset of the members of the worknet subset as members of the activity space, and one or more collaboration tools to facilitate activities among the members of the activity space.

13. The computer program product of claim 12, wherein instantiating a worknet subset includes selecting the worknet subset from among a plurality of predefined channel definitions, wherein each predefined channel definition identifies a subset of members of the worknet to include as the members of the worknet subset.

14. The computer program product of claim 12, wherein instantiating a worknet subset includes applying one or more filtering operations to identify a resulting subset of members of the worknet, wherein the resulting subset of members of the worknet are included as the members of the worknet subset.

15. The computer program product of claim 12, wherein sending a notification to the members of the worknet subset includes receiving input from the worknet creator to omit sending the notification to one or more members of the worknet subset.

* * * * *